US010380341B2

(12) United States Patent
Benoit et al.

(10) Patent No.: US 10,380,341 B2
(45) Date of Patent: Aug. 13, 2019

(54) ADAPTIVE SYSTEMS AND PROCEDURES FOR DEFENDING A PROCESSOR AGAINST TRANSIENT FAULT ATTACKS

(71) Applicant: QUALCOMM Incorporated, San Diego, CA (US)

(72) Inventors: Olivier Jean Benoit, San Diego, CA (US); David Tamagno, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 15/089,379

(22) Filed: Apr. 1, 2016

(65) Prior Publication Data
US 2017/0286680 A1 Oct. 5, 2017

(51) Int. Cl.
*G06F 11/00* (2006.01)
*G06F 21/56* (2013.01)
(Continued)

(52) U.S. Cl.
CPC ......... *G06F 21/566* (2013.01); *G06F 21/554* (2013.01); *G06F 21/75* (2013.01); *G09C 1/00* (2013.01); *H04L 9/004* (2013.01)

(58) Field of Classification Search
CPC ............. G06F 11/0727; G06F 11/076; G06F 11/0787; G06F 11/1415; G06F 2201/86;
(Continued)

(56) References Cited

U.S. PATENT DOCUMENTS 6,327,661 B1 12/2001 Kocher et al.
7,743,262 B2 * 6/2010 Walmsley ............ B41J 2/17503
327/142
(Continued)

FOREIGN PATENT DOCUMENTS

EP            2942732 A1    11/2015
FR            3012637 B1    12/2015
WO    WO-2015169541 A1    11/2015

OTHER PUBLICATIONS

Giraud C., et al., "A Survey on Fault Attacks", Smart Card Research and Applications, International Conference, XX, XX, vol. 6th, Jan. 1, 2004 (Jan. 1, 2004), XP009078209, pp. 159-176.
(Continued)

*Primary Examiner* — Gary S Gracia
(74) *Attorney, Agent, or Firm* — Loza & Loza, LLP

(57) ABSTRACT

Various features pertain to defending a smartphone processor or other device from a transient fault attack. In one example, the processor is equipped to detect transient faults using a fault detection system and to adaptively adjust a control parameter in response to the transient faults, where the control parameter controls a physical operation of the processor (such as by gating its clock signal) or a functional operation of the fault detection system (such as a particular Software Fault Sensor (SFS) employed to detect transient faults). In some examples, in response to each newly detected fault, the detection system is controlled to consume more processor time to become more aggressive in detecting additional faults. This serves to quickly escalate fault detection in response to an on-going attack to promptly detect the attack so that the device can be disabled to prevent loss of sensitive information, such as security keys or passcodes.

42 Claims, 24 Drawing Sheets

(51) Int. Cl.
*G06F 21/55* (2013.01)
*G06F 21/75* (2013.01)
*H04L 9/00* (2006.01)
*G09C 1/00* (2006.01)
*G06F 12/14* (2006.01)

(58) Field of Classification Search
CPC .... G06F 11/002; G06F 21/566; G06F 21/554; G06F 21/75; H04L 9/004
USPC ......... 714/E11.23, 2, 6.1, 20, 30; 726/22, 23
See application file for complete search history.

(56) References Cited

U.S. PATENT DOCUMENTS

| | | | | |
|---|---|---|---|---|
| 8,619,445 | B1* | 12/2013 | Low | H02M 1/32 363/59 |
| 9,116,844 | B2 | 8/2015 | Ozer et al. | |
| 2004/0236961 | A1* | 11/2004 | Walmsley | B41J 2/17503 726/36 |
| 2005/0010778 | A1* | 1/2005 | Walmsley | G06F 21/31 713/176 |
| 2007/0244951 | A1* | 10/2007 | Gressel | G06F 7/582 708/252 |
| 2009/0013178 | A9* | 1/2009 | Silverbrook | G06F 21/31 713/161 |
| 2009/0271676 | A1* | 10/2009 | Biswas | G06F 11/3466 714/733 |
| 2013/0002219 | A1* | 1/2013 | D'Angelo | H05B 33/0812 323/282 |
| 2013/0103972 | A1* | 4/2013 | Ozer | G06F 11/0727 714/2 |
| 2014/0226395 | A1* | 8/2014 | Vilangudipitchai | G11C 7/22 365/154 |
| 2015/0341384 | A1 | 11/2015 | Mandayam et al. | |

OTHER PUBLICATIONS

International Search Report and Written Opinion—PCT/US2017/021455—ISA/EPO—dated May 19, 2017.
Lackner M., et al., "A Defensive Virtual Machine Layer to Counteract Fault Attacks on Java Cards", May 28, 2013, Information Security Theory and Practice, Security of Mobile and Cyber-Physical Systems, Springer Berlin Heidelberg, Berlin, Heidelberg, XP047029142, pp. 82-97.
Verbauwhede I., et al., "The Fault Attack Jungle—A Classification Model to Guide You", Fault Diagnosis and Tolerance in Cryptography (FDTC), 2011 Workshop on, IEEE, Sep. 29, 2011, XP032021640, pp. 3-8.
Oboril F., et al., "A-Soft-AES: Self-Adaptive Software-Implemented Fault-Tolerance for AES," IEEE 19th International On-Line Testing Symposium (IOLTS), 2013, pp. 104-109.

* cited by examiner

*Exemplary Operations Performed in Response to Transient Faults*

Detect a transient fault within a processor device using the Software Fault Sensors (SFS) of a fault detection system, log the time, increment a Fault Detection Counter (FDC) and begin tracking a tracking interval, wherein a relatively unsophisticated default/standard fault detection SFS component/procedure of the fault detection system is employed. ⎯1102

↓

In response to the fault, adaptively adjust one or more of:

- the percentage of processor device resources (Y) devoted to fault detection and/or resistance based, e.g., on Y = f(FDC);

- the frequency with which a fault detection and/or resistance system is activated;

- the threshold(s) used for malicious attack detection;

- the counter(s) used for malicious attack detection;

- the particular SFS or other fault detection systems, procedures or components activated by the processor device or peripheral systems;

- the clock of the processor device to adaptively adjust a ratio of gated clock cycles to non-gated cycles; and/or

- the timing of activation of selected processes relative to other processes running on the processor device.

⎯1104

↓

Detect or track the amount of time since a last transient fault. ⎯1106

↓

Detect and count additional faults using the FDC and further adjust one or more of the parameters listed above to (a) make fault defense more aggressive whenever one or more new transient faults are detected within the tracking interval or to (b) make fault detection less aggressive if a new transient fault is not detected within the tracking interval. ⎯1108

↓

Disable the processor device if the Fault Counter exceeds a threshold during the tracking interval or if a malicious attack is otherwise detected or confirmed. ⎯1110

*FIG. 11*

*Exemplary Operations Performed by a Processing Device*

```
┌─────────────────────────────────────────────────────────────┐
│  Detect transient faults within a processor device (e.g.,   │
│  using a fault detection system) having a set of selectable │──2102
│  fault detection procedures, some of which are more         │
│  thorough or more sophisticated than others, wherein the    │
│  processor device is incorporated into a smartphone, a      │
│  video player, an entertainment unit, a navigation device,  │
│  a communications device, a mobile phone, a music player,   │
│  a personal digital assistant, a fixed location terminal,   │
│  a tablet computer and/or a laptop computer.                │
└─────────────────────────────────────────────────────────────┘
                              │
                              ▼
┌─────────────────────────────────────────────────────────────┐
│  Adaptively adjust a control parameter, in response to the  │
│  at least one transient fault, where the control parameter  │
│  controls one or more of a physical operation of the        │
│  processor device (or a functional operation of the fault   │
│  detection system), wherein the control parameter is        │──2104
│  adaptively adjusted to make fault detection more           │
│  aggressive in response to more frequent transient faults   │
│  and less aggressive in response to less frequent           │
│  transient faults, such as by, e.g., detecting an amount    │
│  of time since a last transient fault, adjusting the        │
│  control parameter to devote more processor resources to    │
│  fault detection if a new transient fault is detected       │
│  within a tracking interval, and adjusting the control      │
│  parameter to devote fewer processor resources to fault     │
│  detection if a new transient fault is not detected within  │
│  the tracking interval.                                     │
└─────────────────────────────────────────────────────────────┘
                              │
                              ▼
┌─────────────────────────────────────────────────────────────┐
│  Additionally or alternatively, adaptively adjust a         │──2106
│  control parameter that controls one or more of: a          │
│  percentage of processor device resources devoted to fault  │
│  detection; a frequency with which fault detection is       │
│  periodically activated by the processor device; a          │
│  threshold used by the processor device for transient       │
│  fault attack detection; a particular fault detection       │
│  procedure used by fault detection to detect a next fault;  │
│  and/or a timing of at least one process running on the     │
│  processor device relatively to at least one other process. │
└─────────────────────────────────────────────────────────────┘
                              │
                              ▼
┌─────────────────────────────────────────────────────────────┐
│  Additionally or alternatively, adaptively adjust a         │──2108
│  control parameter that controls a physical operation of    │
│  the processor device by, e.g., controlling a clock of the  │
│  processor device to run faster or slower or to skip        │
│  selected clock cycles as specified by a hash code that is  │
│  randomly or pseudorandomly generated and which, e.g.,      │
│  selects or controls a ratio of gated to non-gated clock    │
│  cycles.                                                    │
└─────────────────────────────────────────────────────────────┘
                              │
                              ▼
┌─────────────────────────────────────────────────────────────┐
│  Detect a transient fault attack and disable the processor  │──2110
│  device (or perform other selected countermeasures) if a    │
│  count of transient faults exceeds a threshold indicative   │
│  of a transient fault attack.                               │
└─────────────────────────────────────────────────────────────┘
```

*FIG. 21*

ADAPTIVE SYSTEMS AND PROCEDURES FOR DEFENDING A PROCESSOR AGAINST TRANSIENT FAULT ATTACKS

BACKGROUND

Field

The present disclosure pertains to techniques for defending a processor device against transient fault attacks, such as the processor of a smartphone or the like.

Background

Transient fault attacks are physical attacks against a processor where, e.g., a malicious entity selectively applies physical energy or force (i.e. physical perturbations) to the processor in an effort to inject or induce transient operational processing faults that can be used to break the security of the processor to, for example, obtain a security key or enable an otherwise unauthorized transaction. For example, the malicious attacker might direct a laser beam onto a portion of the processor while the processor is running to inject a transient fault by flipping a register bit. This form of attack can exploit the relatively narrow "guard bands" of state-of-the-art processors where there might be a relatively narrow difference between the voltages associated with the ON and OFF states of transistors or the like. If properly timed and applied, such attacks can cause the system to make erroneous decisions during operation, which might reveal a security code or enable an unauthorized transaction such as withdrawal of money from an account. Since the faults are transient rather than permanent, they can be difficult to properly detect and address. In addition, some number of faults will likely occur even in the absence of a malicious attack due to random operational "glitches" triggered by ambient radiation or other environmental factors.

Transient fault attacks may be detected by running fault detection procedures to detect checksum errors. For example, the processor might be equipped to periodically calculate a mathematical function and compare the result with the known (correct) result. If there is no match, a fault is thereby detected. The processor then increments a fault detection counter. If the counter eventually exceeds a predetermined threshold, the device is automatically disabled. If the faults are due to an on-going attack by a malicious user, the attack is thereby thwarted (assuming it has not already been successful). If the faults instead arise naturally, the innocent user then obtains a replacement device, such as by obtaining a new bankcard or the like. Indeed, many vulnerable devices cannot be certified for use unless at least some resistance to fault attacks is provided. See, for example, the standards and criteria associated with organizations such as the Secure Content Storage Association (SCSA) and EMV (Europay/MasterCard/Visa). These strategies can be satisfactory for some devices and in some circumstances. For inexpensive smartcards, for example, the user can just discard the disabled smartcard and obtain a new one. However, for smartphones or other expensive and sophisticated devices, disabling the main processor of the device can impose a significant burden and annoyance on the user. In an emergency situation, where the user might be in jeopardy and need use of the smartphone, a disabled smartphone could have serious and adverse consequences for the user.

Hence, it would be desirable to provide improved systems and procedures for defending against transient fault attacks, particularly for use in smartphones or other devices where predecessor approaches might not be satisfactory.

SUMMARY

A method operational on a processor device is described. Transient faults within the processor device may be detected (e.g., using a fault detection system). A control parameter (of a transient fault defense system) of the processor device may be adaptively adjusted in response to the transient faults to adaptively control an amount of processor device resources devoted to transient fault defense compared to an amount of processor device resources devoted to other operations.

In another aspect, a processor device may detect transient faults within the processor device (e.g., using a fault detection system). The processor device may then adjust a control parameter (e.g., of a transient fault defense system) of the processor device in response to the transient faults to adaptively control an amount of processor device resources devoted to transient fault defense compared to an amount of processor device resources devoted to other operations.

In yet another aspect, a device includes: means for detecting transient faults within the processor device; and means for adaptively adjusting a control parameter of the processor device in response to the transient faults to adaptively control an amount of processor device resources devoted to transient fault defense compared to an amount of processor device resources devoted to other operations.

In still yet another aspect, a machine-readable storage medium includes one or more instructions which when executed by at least one processing circuit causes the at least one processing circuit to: detect transient faults within the processor device; and adaptively adjust a control parameter of the processor device in response to the transient faults to adaptively control an amount of processor device resources devoted to transient fault defense compared to an amount of processor device resources devoted to other operations.

In another aspect, a method operational on a processor device, includes: detecting transient faults within the processor device; and adaptively adjusting a clock signal of the processor device in response to the transient faults to selectively gate clock cycles.

In another aspect, a processor device may be configured to: detect transient faults within the processor device; and adaptively adjust a clock signal of the processor device in response to the transient faults to selectively gate clock cycles.

In yet another aspect, a device includes: means for detecting transient faults within the processor device using a fault detection system; and means for adaptively adjusting a clock signal of the processor device in response to the transient faults to selectively gate clock cycles.

In still yet another aspect, a machine-readable storage medium having one or more instructions which when executed by a processing circuit causes the processing circuit to: detect transient faults within the processor device using a fault detection system; and adaptively adjust a clock signal of the processor device in response to the transient faults to selectively gate clock cycles.

DRAWINGS

Various features, nature, and advantages may become apparent from the detailed description set forth below when taken in conjunction with the drawings in which like reference characters identify correspondingly throughout.

FIG. 1 illustrates an exemplary transient fault attack system that might be used by an attacker to obtain sensitive information from a device.

FIG. 2 provides an overview of fault attack defensive strategies.

FIG. 11 further illustrates exemplary operations of an adaptive defense system in response to transient faults.

Figure 12:
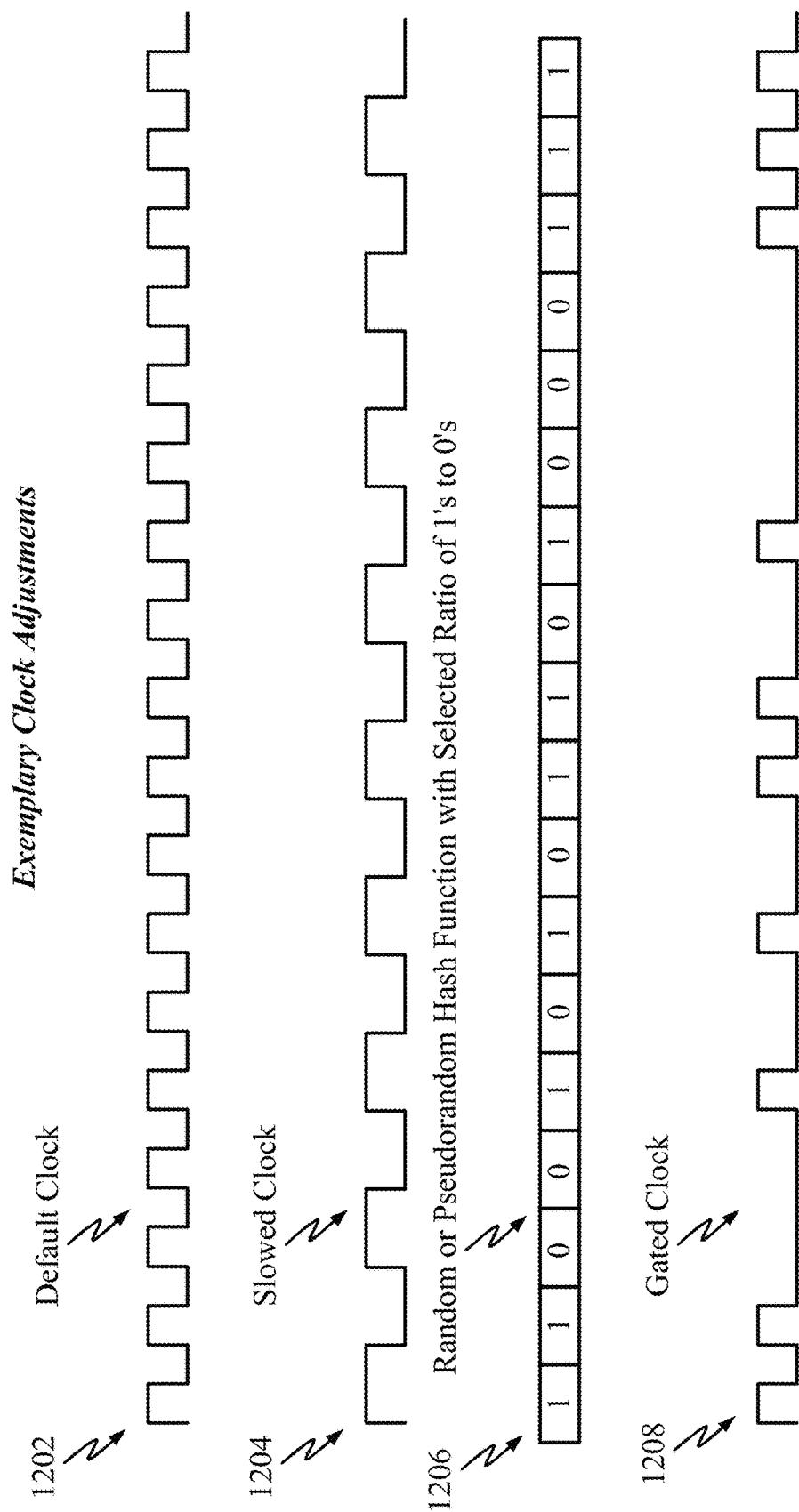

FIG. 12 illustrates exemplary processor clock adjustments performed by an adaptive defense system in response to transient faults.

Figure 13:
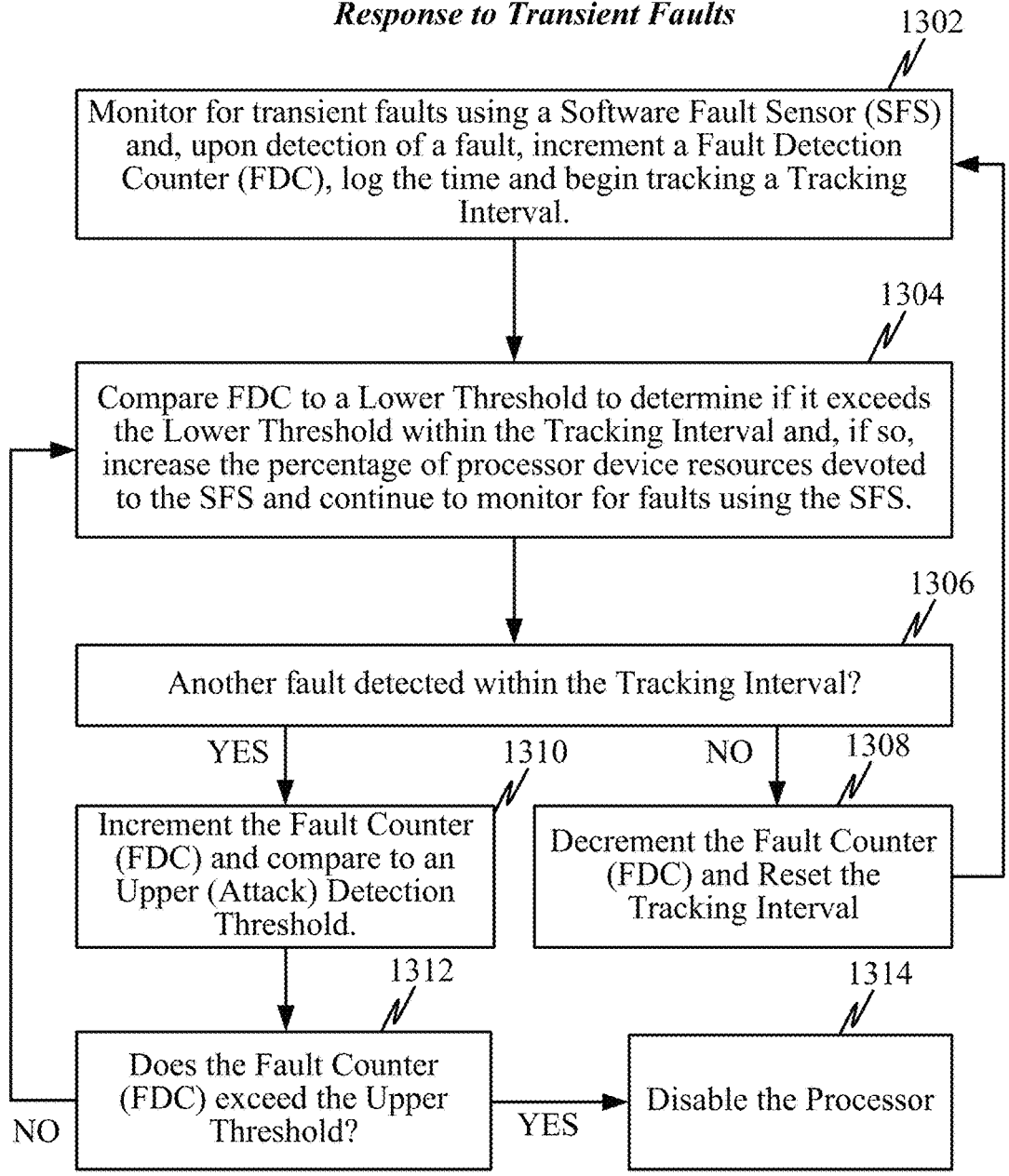

FIG. 13 illustrates an exemplary process performed in response to transient faults that selectively increments and decrements a Fault Detection Counter (FDC).

Figure 14:
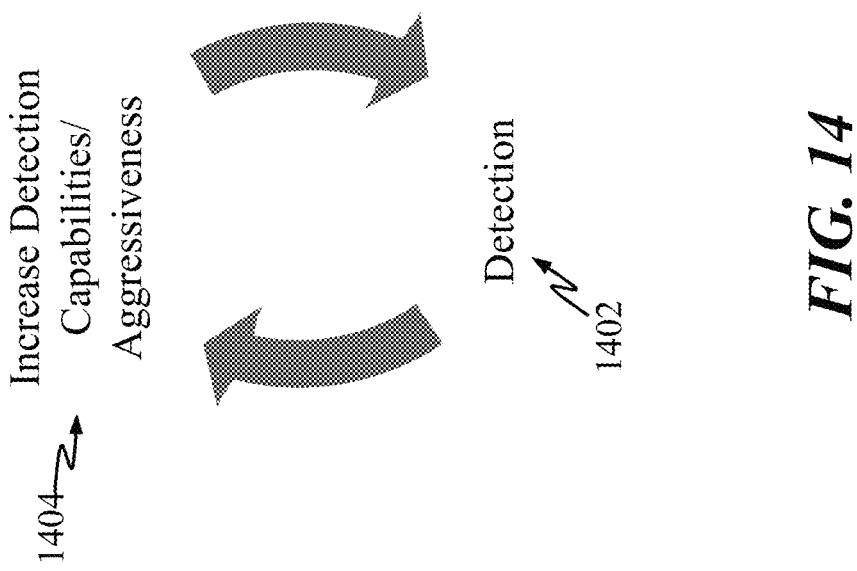

FIG. 14 summarizes features of the adaptive defense system.

Figure 15:
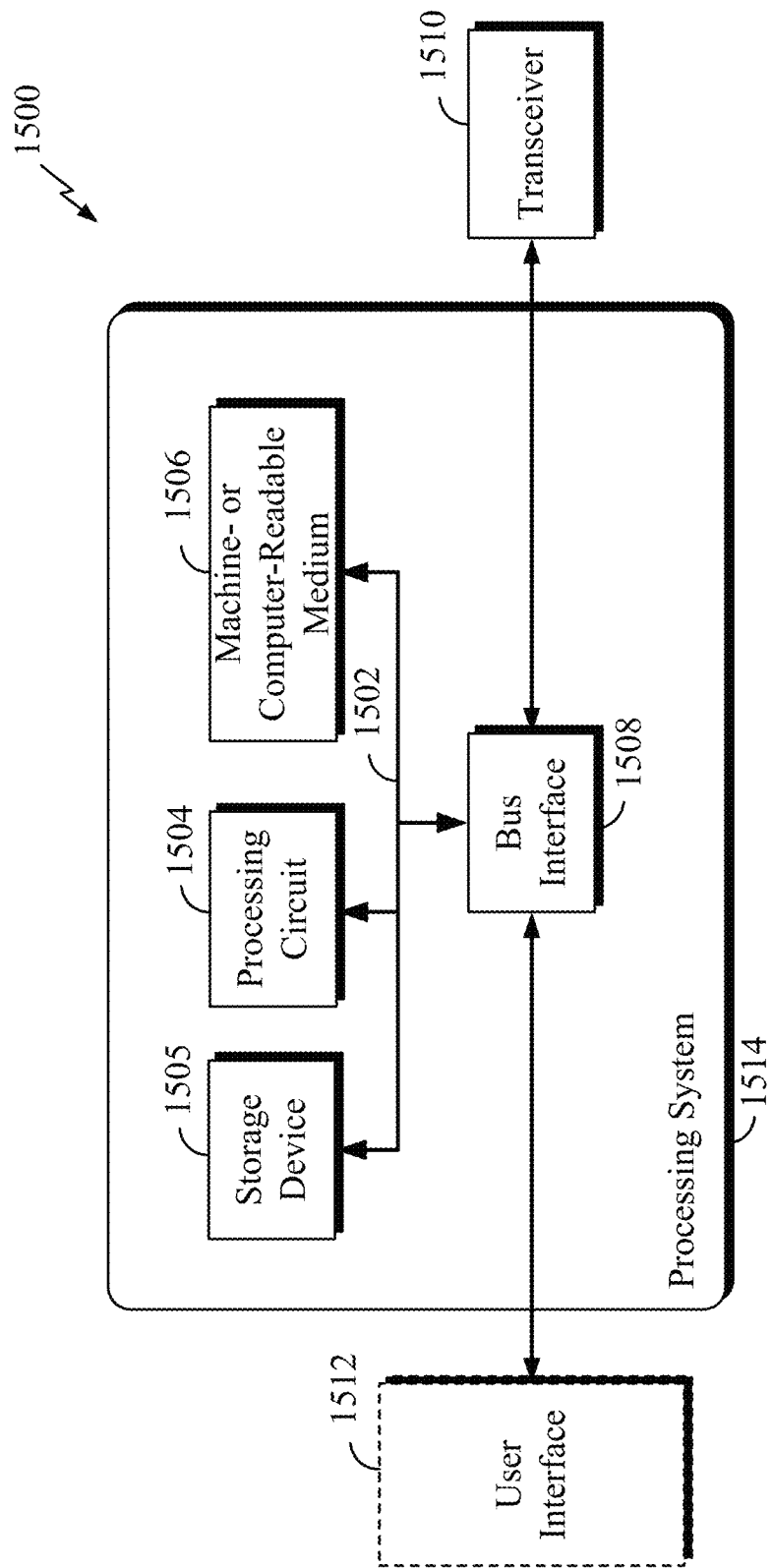

FIG. 15 is a block diagram illustrating an example of a hardware implementation for an apparatus employing a processing system that may exploit the systems, methods and apparatus of FIGS. 2-14.

Figure 16:
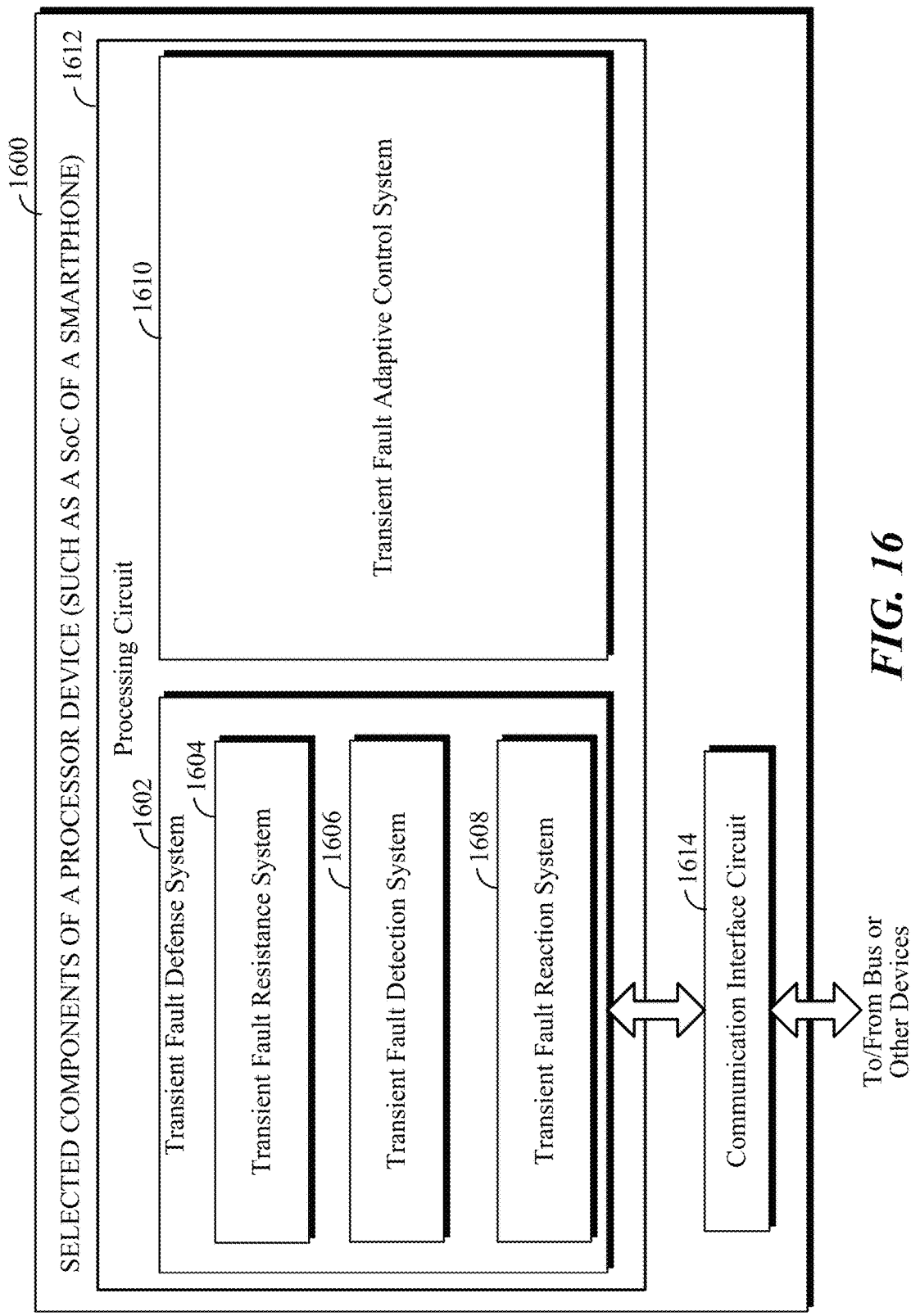

FIG. 16 is a block diagram illustrating selected and exemplary components of a processor device directed to adaptively controlling transient fault defenses.

Figure 17:
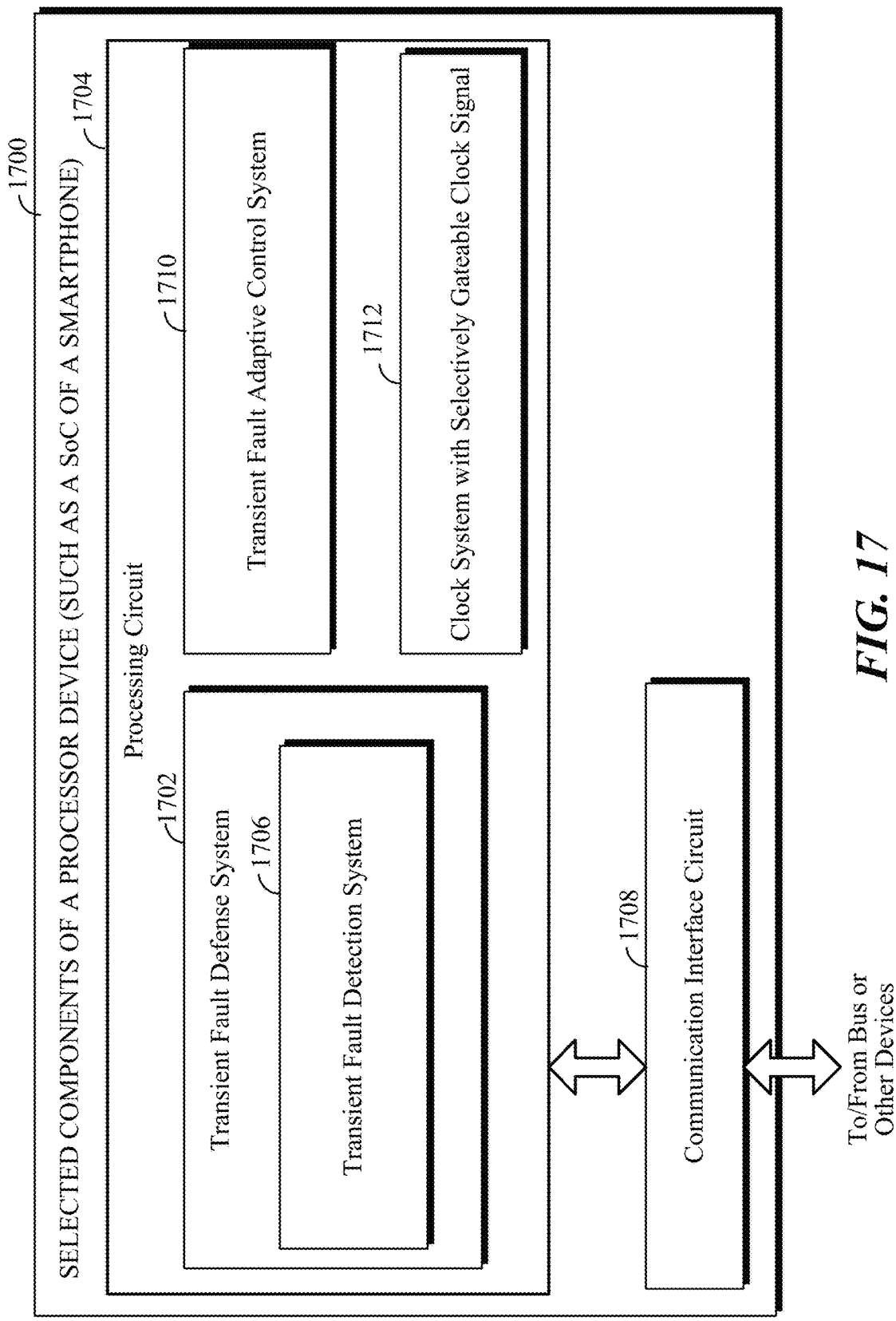

FIG. 17 is a block diagram illustrating selected and exemplary components of a processor device directed to adaptively controlling a processor clock.

Figure 18:
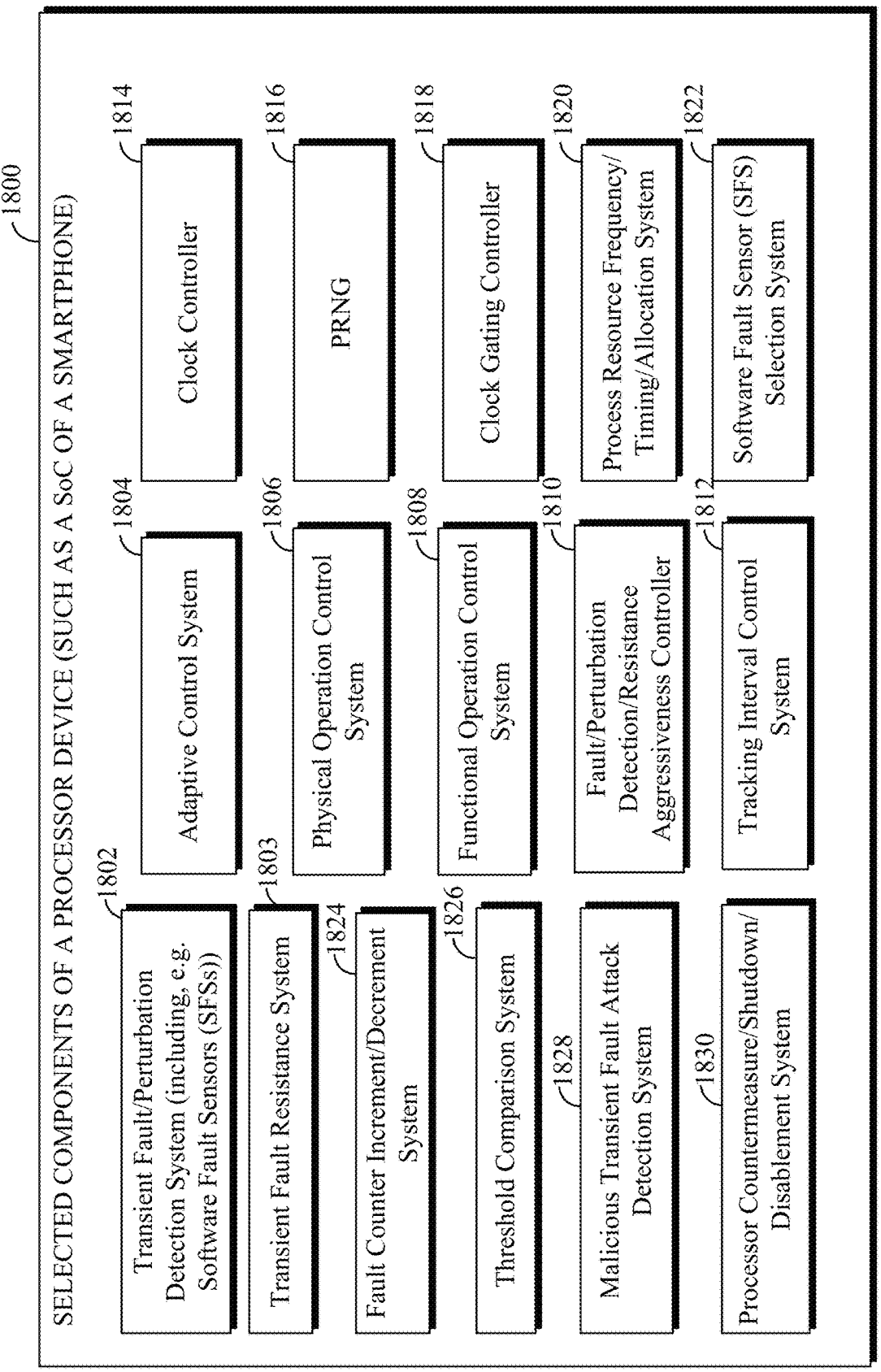

FIG. 18 is a block diagram illustrating selected and exemplary components of a processor device including components for both adaptively controlling transient fault defenses and adaptively controlling the processor clock.

Figure 19:
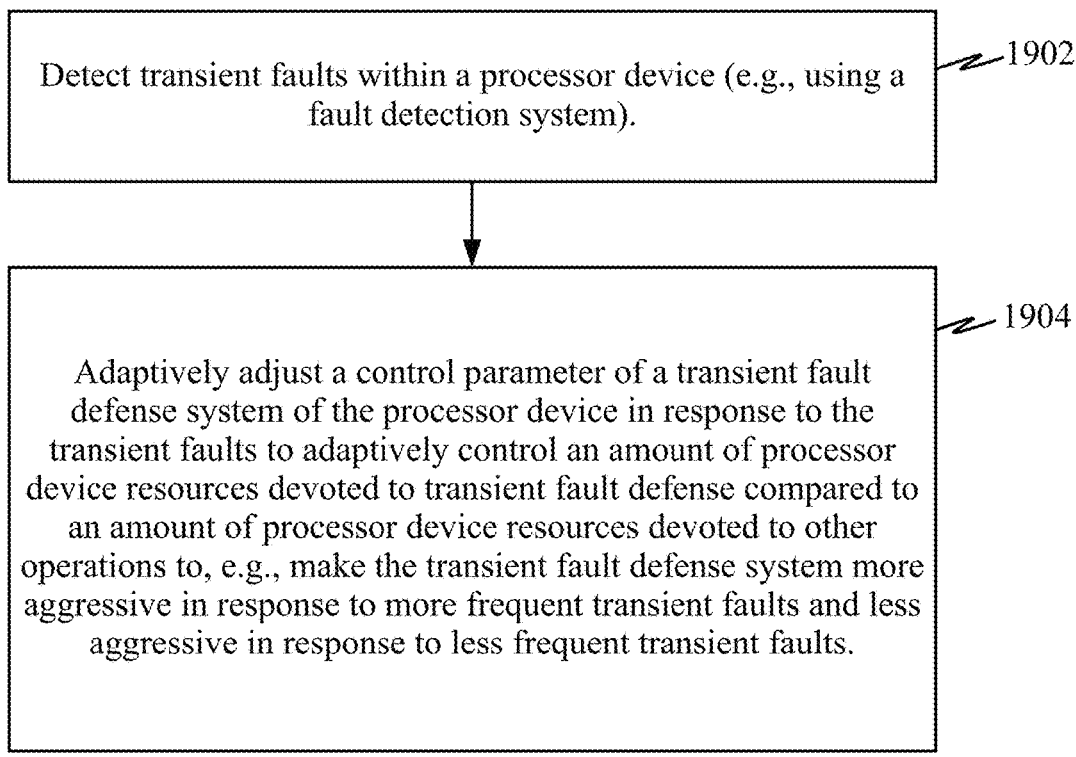

FIG. 19 is a flow diagram broadly illustrating a method operational on a processor device for adaptively controlling transient fault defenses.

Figure 20:
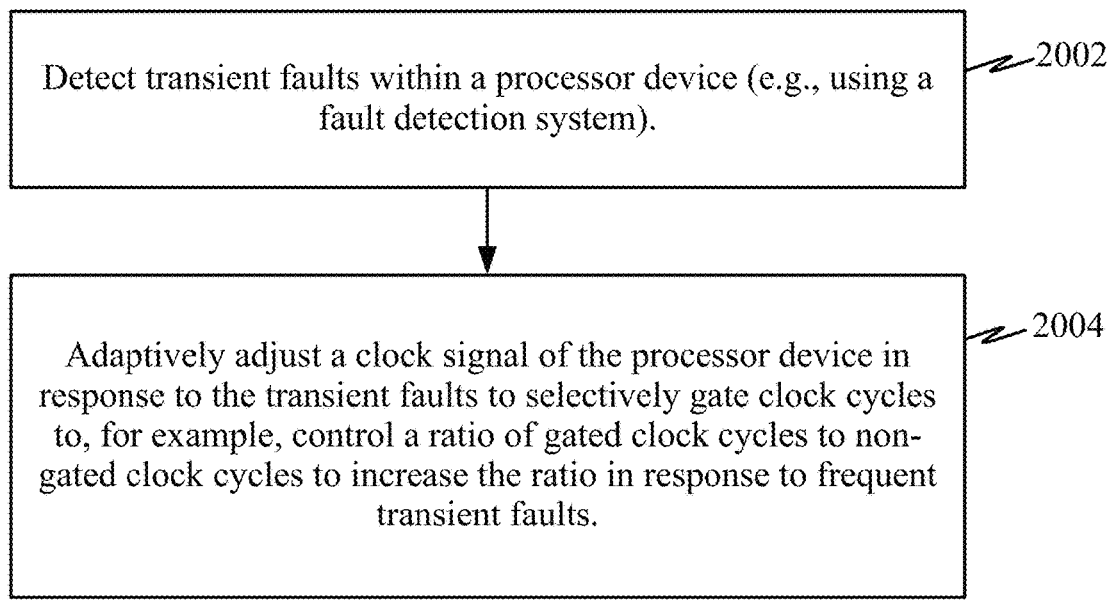

FIG. 20 is a flow diagram broadly illustrating a method operational on a processor device for adaptively controlling the processor clock.

FIG. 21 is a flow diagram further illustrating exemplary methods operational on a processor device including procedures for both adaptively controlling transient fault defenses and adaptively controlling the processor clock.

Figure 22:
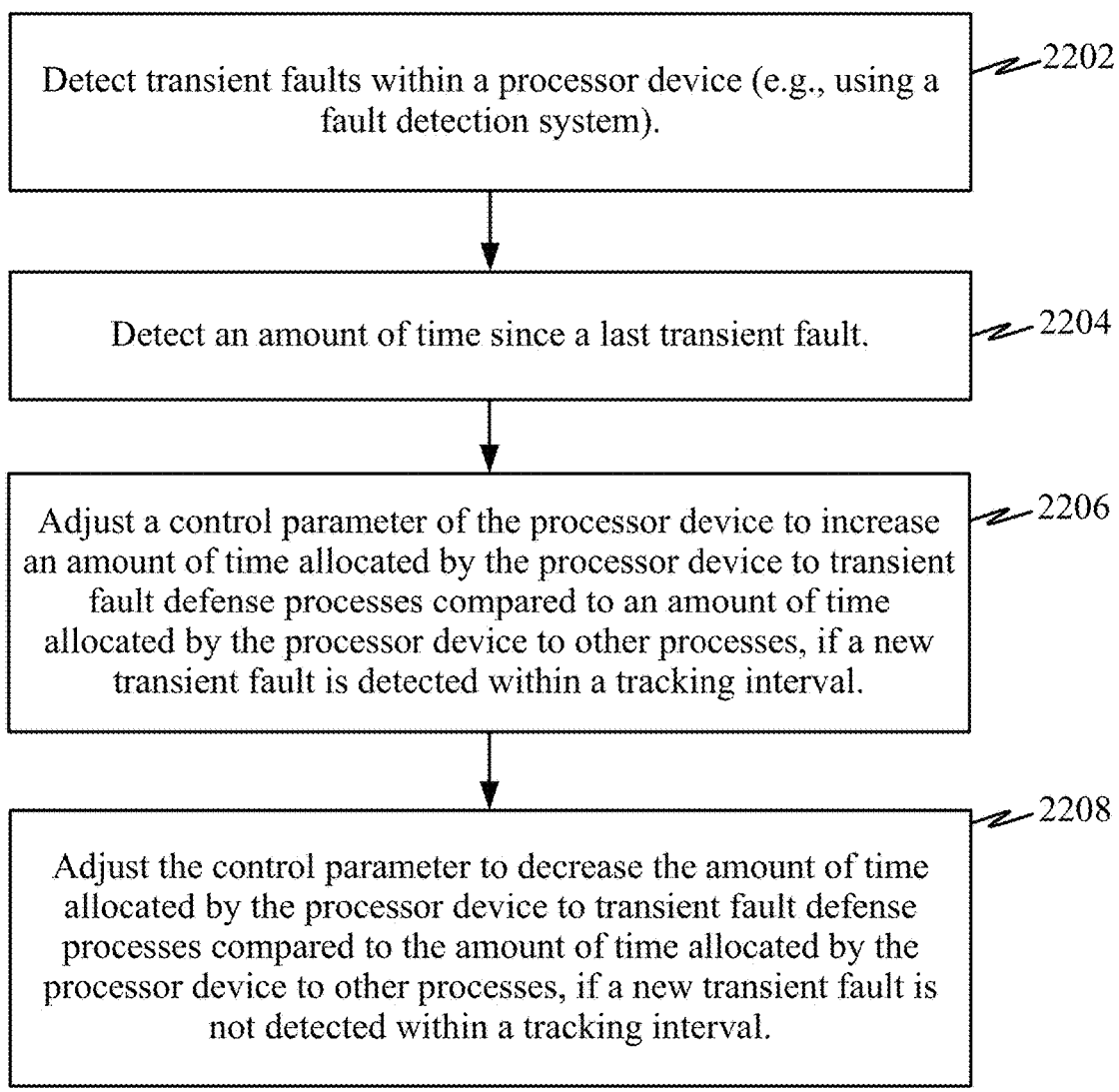

FIG. 22 is a flow diagram broadly illustrating another method operational on a processor device.

Figure 23:
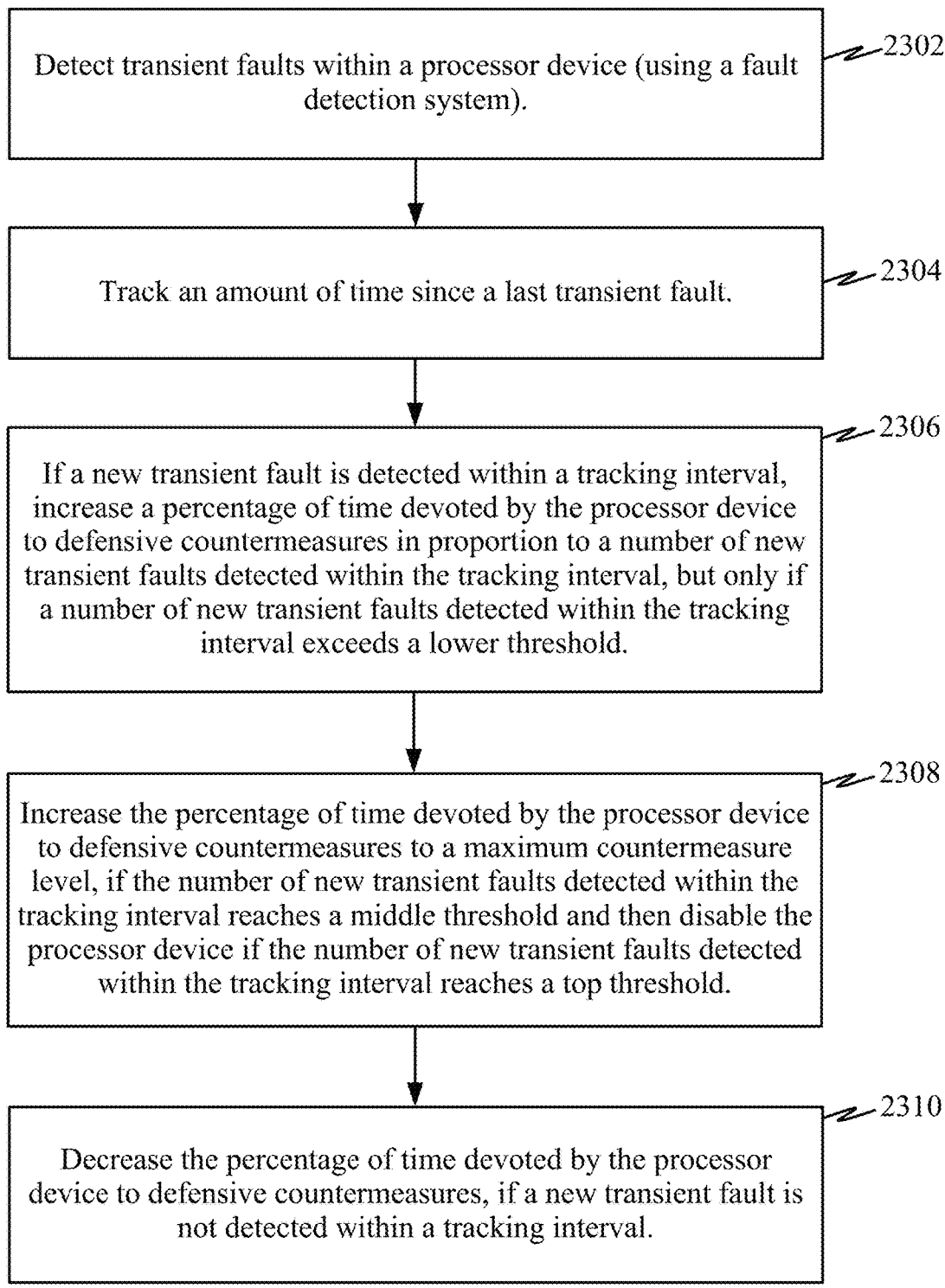

FIG. 23 is a flow diagram broadly illustrating yet another method operational on a processor device.

Figure 24:
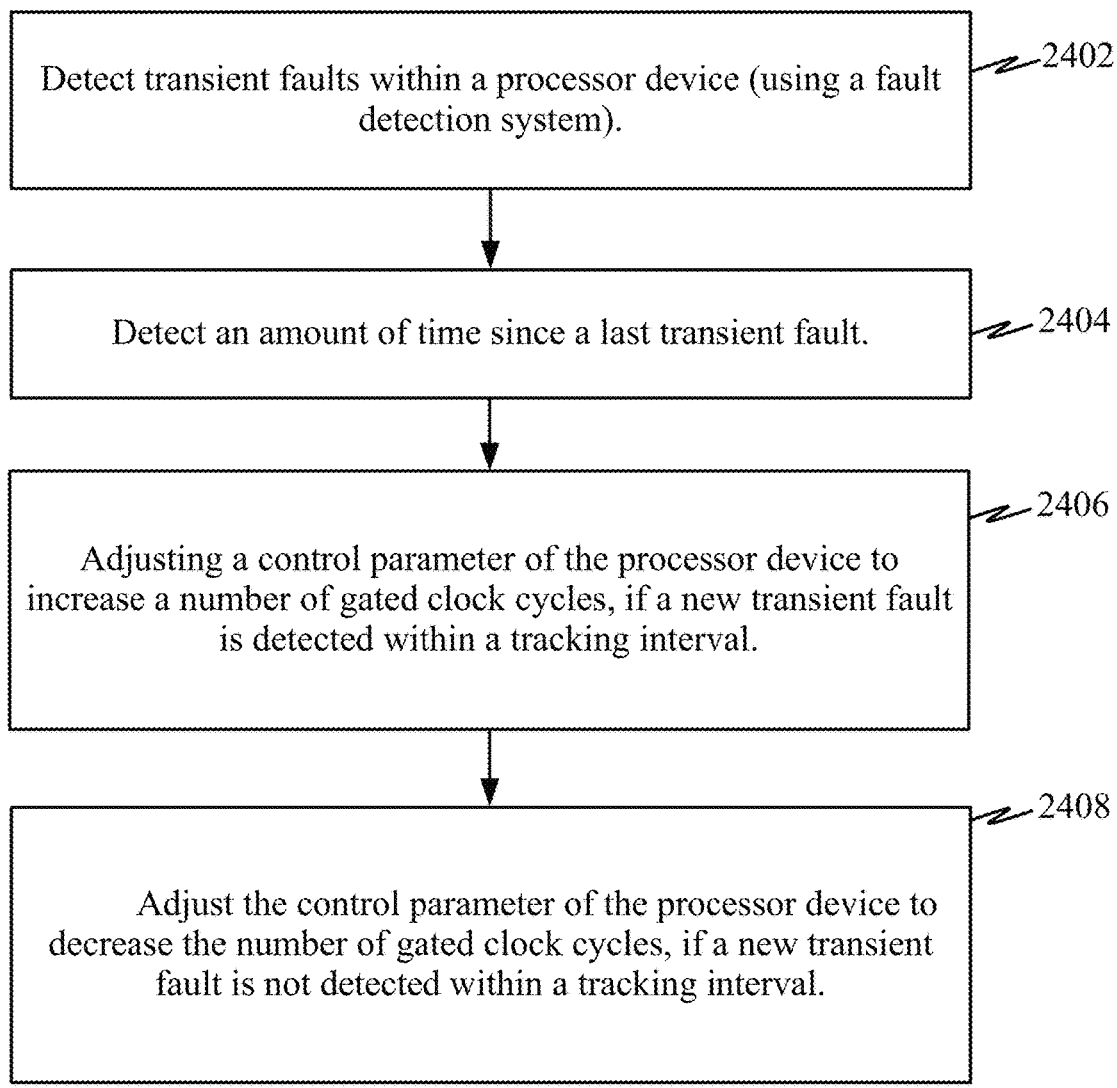

FIG. 24 is a flow diagram broadly illustrating still yet another method operational on a processor device.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

Figure 1:
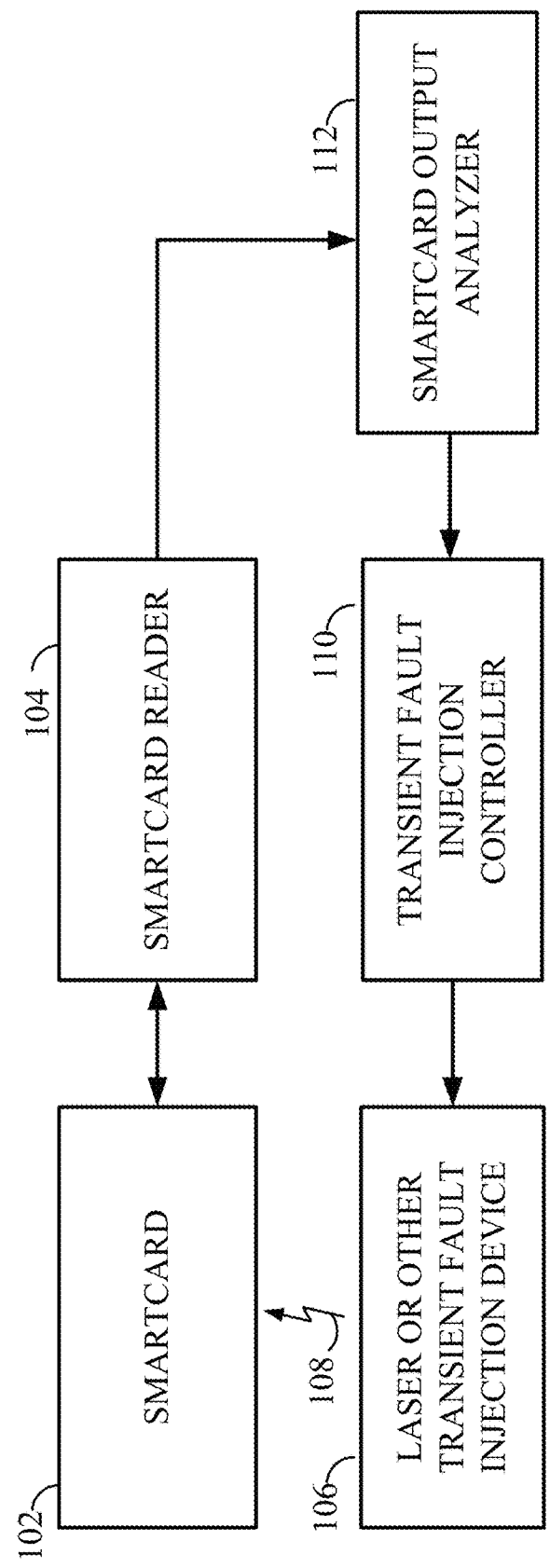

FIG. 1 illustrates a transient fault attack system 100 used by a malicious entity (i.e. an attacker). For the purposes of illustration and explanation, the device under attack in this particular example is a stolen smartcard 102. However, the exemplary transient fault attack procedures described herein are applicable to other vulnerable devices or components thereof, including the processors of smartphones or the like. In FIG. 1, the stolen smartcard 102 is coupled to a smartcard reader 104, which is equipped to prompt the system to output a security code or other desired information in response to proper credentials. The malicious attacker, however, lacks those credentials and hence seeks to induce the stolen smartcard to output the security code despite the lack of proper credentials by inducing one or more transient faults within the chip of the smartcard. To this end, a laser or other transient fault injection device 106 is used by the attacker to apply heat, light or other forms of electromagnetic energy 108 to the smartcard 102 in an effort to induce or inject transient faults within the processing chip of the smartcard. For example, the laser beam might be applied to a particular portion of the processing chip of the smartcard that is known to be vulnerable to transient fault injection. As explained above, the injection of a transient fault might flip a register bit by exploiting the relatively narrow guard bands of state-of-the-art processors where there might be a relatively narrow difference between the voltages associated with the ON and OFF states of transistors or other circuit components. In other examples, an attacker might induce power supply fluctuations or clock perturbations. If properly timed and applied, such attacks can cause the chip to make erroneous decisions during operation, which might reveal a security code that can be used to enable unauthorized transactions.

Accordingly, the attacker might use a transient fault injection controller 110 to control the injection device 106 to selectively apply a laser beam or other energy source to the smartcard 102 in an effort to induce one or more injection faults, in hopes that the faults will cause the chip of the smartcard 102 to make erroneous decisions and output information sufficient to reveal a passcode or other desired information. Concurrently, output from the smartcard 102 is read by the smartcard reader 104 and forwarded to a smartcard output analyzer 112, which analyzes the output to determine if the passcode or other desired information can be obtained from the output. Information obtained by the smartcard output analyzer 112 is fed back into the transient fault injection controller 110 to further control the injection device 106. In some cases, the application of a laser pulse is carefully timed in an effort to enhance the likelihood of triggering a fault that will reveal the desired information. That is, the attack exploits "time localization." This may be achieved by, for example, applying a prompt to the smartcard 102 using the smartcard reader 104 that triggers a known interrupt within the chip of the smartcard 102 and then delivering a laser pulse at a precisely-controlled time after the interrupt to maximize the likelihood of obtaining the desired information.

In practice, it might take hours of periodically applying the laser beam to the smartcard 102 while the smartcard 102 is repeatedly prompted by the smartcard reader 104 before a transient fault is triggered that is sufficient to reveal the desired information. Assuming the attacker is successful in obtaining the security code of the smartcard 102, the smartcard 102 can then be taken to an automated teller machine (ATM) or the like to extract funds or to enable other unauthorized transactions. If the information to be gained is sufficiently valuable (e.g. a fairly large amount of money can be obtained) and the time needed to "crack" the smartcard is not too long, then an attacker may find it worthwhile to perform the procedures of FIG. 1. However, if the procedure is too time consuming or if there is a significant likelihood that the smartcard will be disabled automatically by an internal fault detection system within the smartcard before the attacker can complete his or her attack, then such an attack would not likely be deemed worthwhile. Systems and procedures are described herein that, e.g., serve to (a) make a successful attack far more time consuming and/or (b) greatly increase the likelihood that the device under attack will automatically disable itself before the attacker can complete the attack, thereby discouraging or preventing such attacks.

As explained above, one technique for defending against transient fault attacks is to provide a fault detection system within the processor or chip to detect transient faults. The system may count the number of transient faults and, if the fault count exceeds a predetermined limit, the processor automatically disables itself. However, to detect an on-going transient fault attack in time to disable the processor before the attack can be completed, the limit may need to be set to a fairly low value. If so, a series of naturally occurring transient faults, which might be triggered by ambient radiation or the like, could then cause the processor to shut down in the absence of an actual attack. This may not be a significant problem for a relatively inexpensive smartcard where the user can discard the disabled smartcard and obtain a new one. However, for smartphones or other expensive and sophisticated devices, disabling the main processor of the device can impose a significant burden on the user. Accordingly, the systems and procedures described hereinbelow, although applicable to a wide variety of processors or chips, are primarily intended for use with processors within smartphones or other relatively expensive and sophisticated devices. Other examples of relatively sophisticated devices include navigation devices, communications devices, mobile phones, personal digital assistants (PDAs), fixed location terminals, tablet computers, music players, video players, entertainment units and/or laptop computers.

Note that to perform a transient fault attack against a stolen smartphone or similar device, the attacker would typically break open the device to remove (or at least expose) the main processor of the device so that a laser beam or the like can be applied to the processor. Assuming the attacker successfully obtains a password or other security key stored within the device, the attacker might then use the password to access a banking system via a website to initiate an unauthorized financial transaction. The smartphone itself would then most likely be discarded. Note, though, that the transient attack examples described herein are merely illustrative and a wide variety of other forms of the attack could be performed to obtain a wide variety of desired information from a device or to cause the device under attack to perform a wide variety of desired functions. Note also that transient faults attacks might be combined within other types of malicious attacks, such as side-channel attacks or the like.

To address these and other issues, various adaptive systems and procedures are described herein. In one example, an adaptive procedure is provided whereby processor fault defense procedures (which might be otherwise conventional) are throttled in response to the detection of faults to make the procedures more aggressive in response to frequent faults and less aggressive in response to infrequent faults. That is, at least one functional operation of the fault detection/resistance system is adaptively adjusted so as to devote more processor device resources to transient fault defense. In one example, where the processor periodically runs a fault detection program to detect transient faults via checksum errors, the frequency with which the program is activated is increased in response to detection of each new fault within a certain interval of time to thereby devote more processor device resources to transient fault detection and make the fault detection more aggressive. As a particular example, a fault detection procedure that otherwise might run once per second is accelerated to run ten times per second, then a hundred times per second, etc. If no new fault is detected within the interval, the frequency is reduced. If too many faults are then detected (e.g., a fault count exceeds a programmable and adjustable threshold), the processor is disabled or other countermeasures are taken.

By making fault defense progressively more aggressive in response to a series of faults, the frequent faults triggered by a malicious attack will rapidly escalate the fault count, triggering a fairly prompt shutdown of the device. However, infrequent faults caused by ambient conditions or otherwise innocent operational "glitches" will only temporarily increase the aggressiveness of fault detection/resistance and will not result in shutdown of the device. Note also that while fault defense is operating in a more aggressive state, it will likely take longer for an attacker to "break" the system since more and more of the processor's resources will be devoted to running fault detection/resistance procedures. Hence, a malicious attack becomes more difficult because (a) there is less total time available to break or "crack" the system before the processor is disabled in response to too many faults and (b) during that time the processor is devoting more and more resources to running fault defense procedures (rather than other processes that might reveal sensitive information if a fault is induced during their operation). For example, if the processor ordinarily devotes 1% of its time to running fault detection and/or resistance procedures, that percentage can be adaptively increased in response to frequent faults to 10%, 50%, and then 90%, etc.

Herein, the term "aggressiveness" generally refers to the relative amount of resources devoted to resisting faults, detecting faults and/or responding to faults, with a relatively more aggressive procedure devoting more processor resources to resisting detecting and/or responding to transient faults and a relatively less aggressive procedure devoting fewer processor resources to resisting, detecting and/or responding to transient faults. A more aggressive procedure is more likely to detect a transient fault that has been injected into the processor as compared to a less aggressive procedure. A more aggressive procedure is more likely to conclude that a transient fault attack that has been initiated and take appropriate countermeasures as compared to a less aggressive procedure. As such, an aggressive procedure is one that is generally more robust against fault attacks.

In general, any software or hardware parameter or configuration that affects fault detection and/or fault resistance can be adaptively adjusted, not just those related to aggressiveness. Software examples described herein include adjusting the frequency or duration of periodic fault detection procedures and/or using more thorough and sophisticated fault detection procedures in response to frequent faults while using less thorough and less sophisticated procedures when there are infrequent faults. In some examples, counters are used to count transient faults and then adaptive countermeasures are employed that scale as a function of the counter value. Although the examples described herein primarily related to fault defense, the various techniques described herein may be used in connection with physical perturbations (discussed below) rather than faults, where applicable. Multiple counters can be used, including different counters for counting actual faults, as opposed to perturbations. In some examples, the timing of some processes running on the processor is adaptively adjusted relative to other processes based on faults or perturbations. This is helpful in defending against attacks that rely on the precise timing of injected transient faults, i.e. attacks that rely on time localization. Hardware examples described herein of adaptive adjustments include selectively adjusting the clock of the processor and, in particular, selectively skipping or "gating" clock cycles. By skipping some clock cycles, malicious attacks that rely on the precise timing of injected transient faults become far more difficult since the timing of the operations of the processor is offset due to the skipped clock cycles. That is, the time localization of procedures is adaptively adjusted to provide a "moving target" for an attacker to make the attack more difficult. Any of the adaptive adjustments, whether in software or in hardware, can include random or pseudorandom components to further thwart malicious attacks. For example, the gating of clock cycles can be based on a randomly generated hash code that controls which clock cycles are skipped.

Among other features, the adaptive procedures described herein can serve to: (a) limit the impact of security features on overall performance while greatly increasing the resistance level when required; (b) reconfigure the processor chip with more aggressive security parameters in response to each fault injection; and (c) provide a moving target for the attacker if the time localization of a target process is changed, thus (d) often leading to an increasing chance or likelihood of detecting on-going attacks. This provides a "virtuous cycle" which greatly discourages transient fault attacks.

Defensive Strategies and Other Considerations

Fault attacks can affect the hardware behavior of a chip or other processor and therefore potentially affects the software that runs on the hardware. A fault attack modifies some operation or feature on the chip and usually translates into one or more bit flips, which can be detected with appropriate sensors. A suitable strategy against fault attacks is to enable the system to detect that it is under attack, which then allows it to react accordingly. An additional goal is to reduce the probability of success when an attacker repeats the same attack on another device in order to reduce the exploitation of the attack on a field of devices. Increasing the resistance is also beneficial because it forces the attacker to inject more faults before succeeding, which in turn increases the chance of detection of the faults, thereby triggering more aggressive countermeasures.

Figure 2:
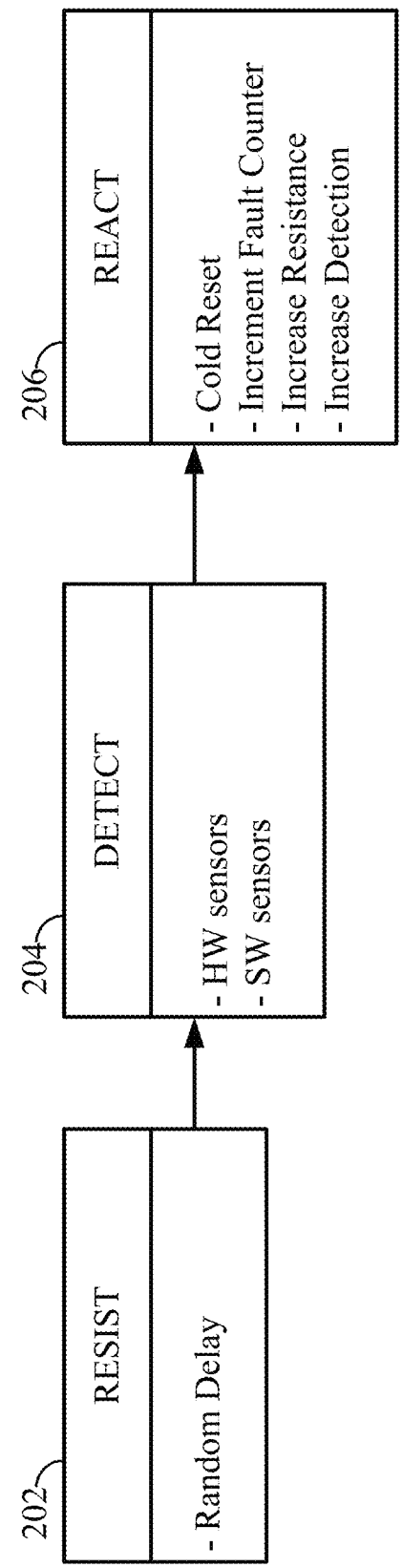

FIG. 2 illustrates an overall defensive strategy that includes a resistance block 202 (i.e. RESIST), a detection block 204 (i.e. DETECT) and a reaction block 206 (i.e. REACT). An exemplary form of resistance is a random delay. Exemplary forms of detection include hardware (HW) and software (SW) sensors. Exemplary forms of reaction include a cold reset, incrementing a fault counter (that may be used to trigger various reaction functions), increasing resistance and increasing detection. A system that controls or performs fault resistance procedures, fault detection procedures and/or fault reaction procedures (e.g. countermeasures) may be referred to as a fault defense system. Collectively, fault resistance procedures, fault detection procedures and/or fault reaction (e.g. countermeasures) procedures may be referred to as a fault defense procedures.

Figure 3:
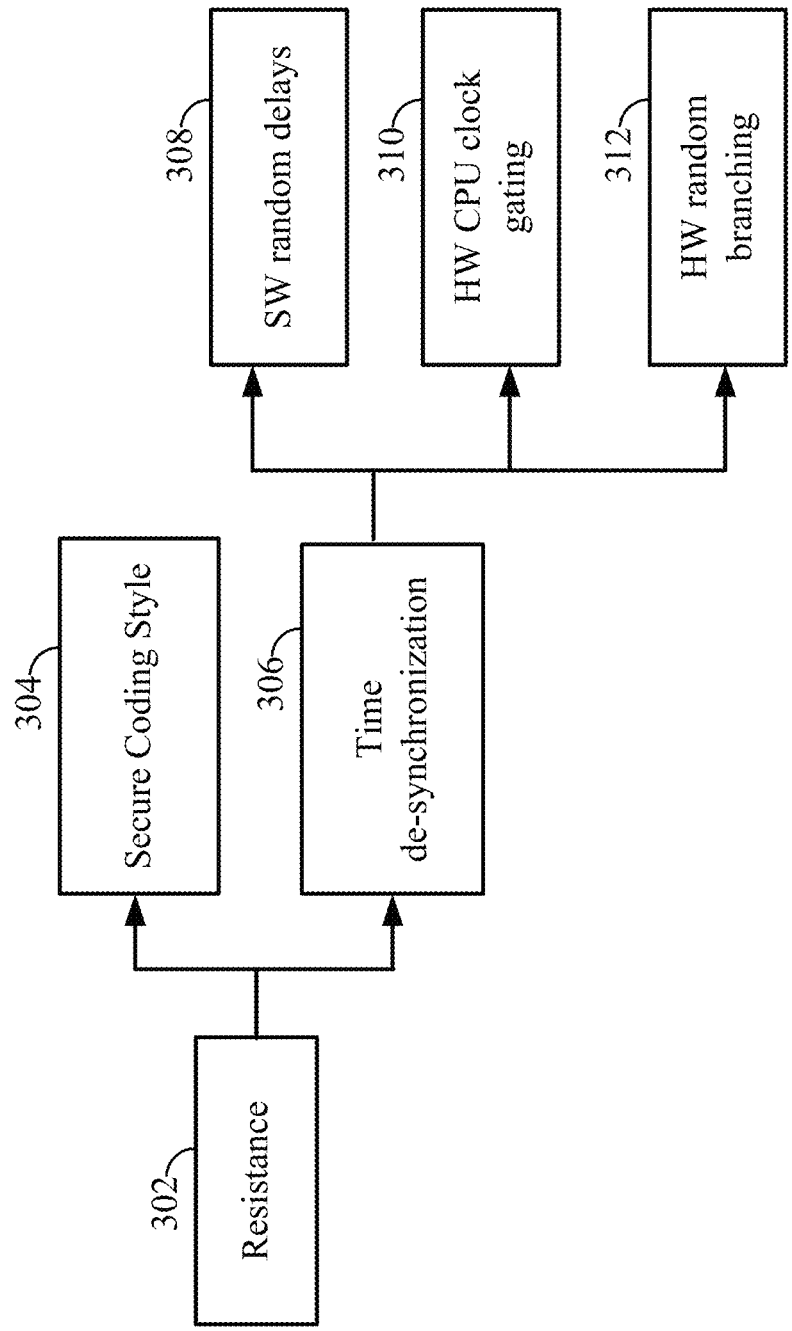
FIG. 3 illustrates exemplary fault resistance system and procedures.

FIG. 3 further illustrates resistance strategies by showing a resistance block 302 that may involve or exploit secure coding 304 and/or time-desynchronization 306. Examples of time-desynchronization include SW random delays 308, HW CPU clock gating 310 and HW random branching 312. By using these techniques, the intrinsic resistance of the system may be increased by decreasing reproducibility through time de-synchronization and by using a secure coding style that reduces the probability of a successful attack. Time de-synchronization can be achieved in SW and/or HW. Note that HW random delays can provide generic coverage across the board. SW random delay may be selectively added (e.g. only in sensitive processes) to provide an extra layer of security, especially between sensitive tests and corresponding redundant tests to significantly reduce the probability of an attacker successfully injecting two faults to overcome a redundancy test.

Figure 4:
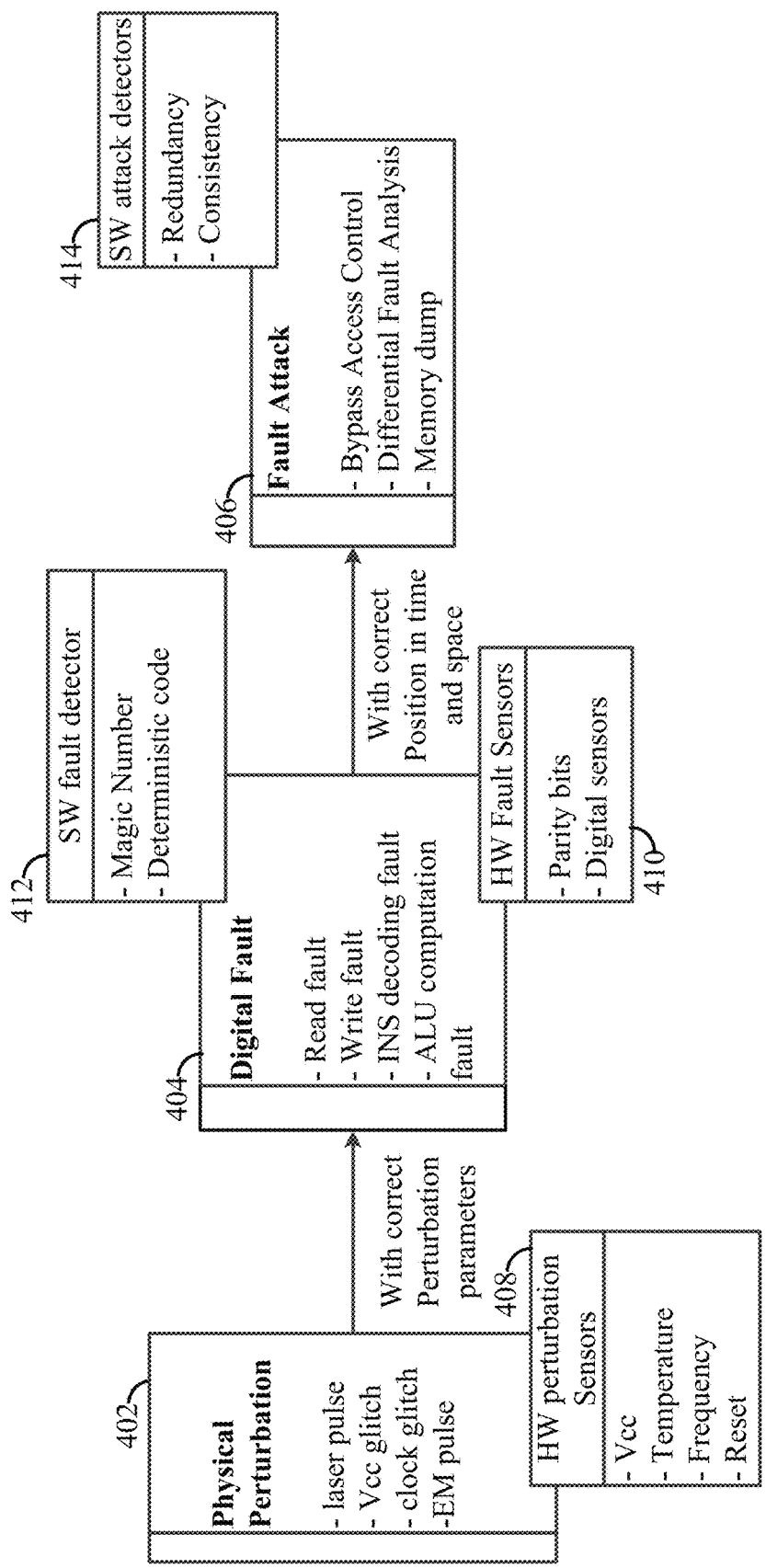
FIG. 4 illustrates exemplary fault detection system and procedures.

FIG. 4 further illustrates detection strategies that may be applied in response to the three main steps performed by an attacker to successfully mount a fault attack: (1) physical perturbations 402 with correct perturbation parameters are applied by an attacker that (2) trigger digital faults 404 with correct positioning in both time and space (i.e. chip location) thus (3) yielding a fault attack 406. In this regard, detection strategies may be directed to detecting the fault attack or the conditions or circumstances that might lead to an attack. This may achieved by implementing in the system various types of sensors (in HW) and detectors (in SW) operative at any or all of the three steps used by the attacker. Note that it is possible to implement fault detectors in software either through generic mechanisms or ad-hoc mechanisms within existing code. Examples of physical perturbations 402 that may be applied by an attacker include laser pulses, the inducement of voltage glitches (e.g. power supply Vcc glitches), the inducement of clock glitches or the application of electromagnetic (EM) pulses. One or more HW perturbation sensors 408 may be used to detect perturbations, such as by monitoring Vcc levels, chip temperatures, operational frequencies and/or by detecting chip reset conditions. Exemplary digital faults 404 include read faults, write faults, instruction set (INS) decoding faults and algorithmic logic unit (ALU) computation faults. One or more HW fault sensors 410 may be used to detect such faults by, e.g., using parity bits or digital sensors. In addition, one or more SW fault sensors 412 may be used such as "magic number"-based detectors (such as detectors exploiting so-called magic debug values) or deterministic code detectors. The fault attack 406 itself may bypass access control, trigger a differential fault analysis or a memory dump, which may be detected using redundancy-based or consistency-based SF fault attack detectors 414.

Figure 5:
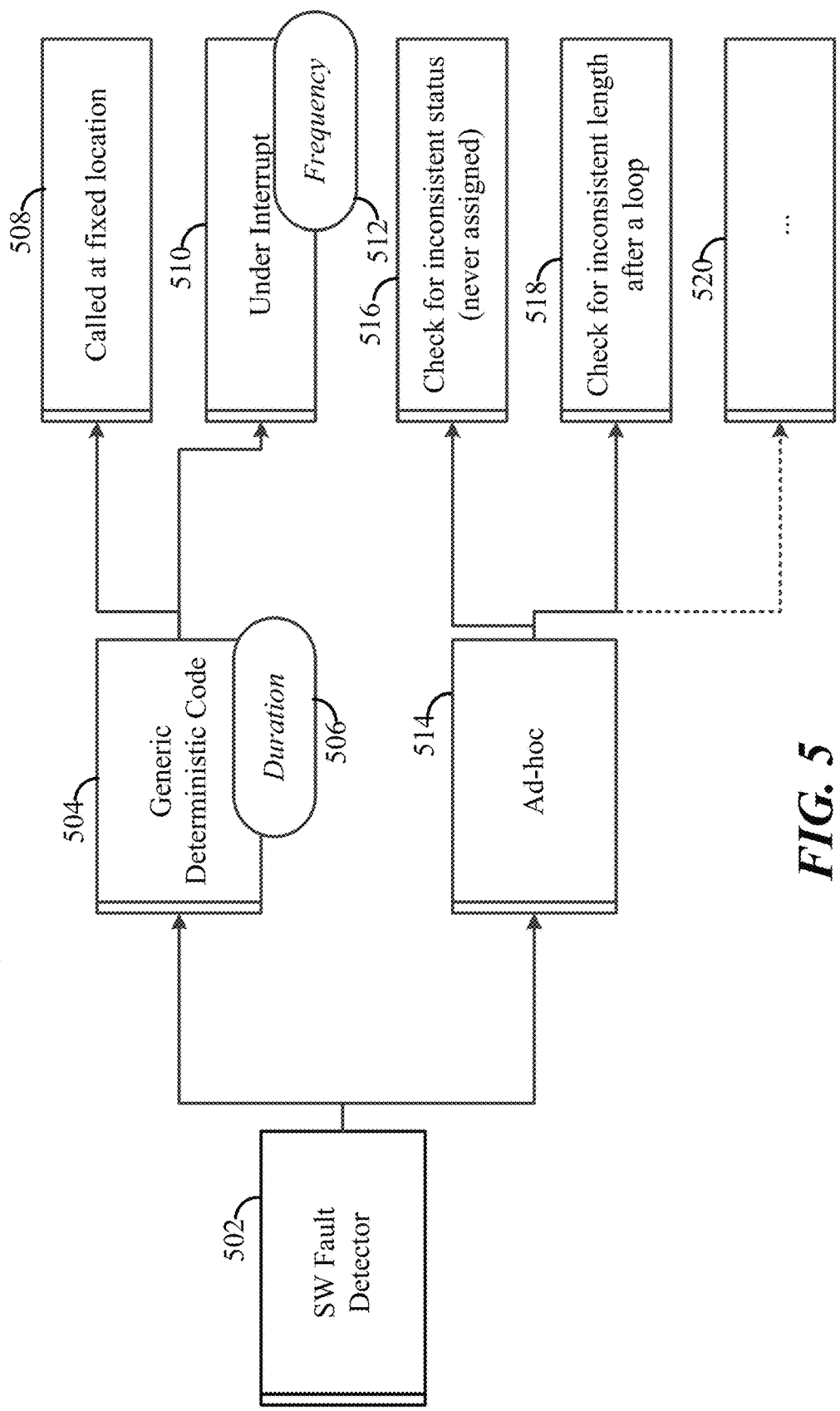
FIG. 5 illustrates exemplary software fault detection system and procedures.

FIG. 5 further illustrates SW fault detection systems and procedures that may be performed by a SW fault detector 502. Generic software fault detectors have at least one parameter that can be modified at runtime: the code duration. Accordingly, generic deterministic code 504 may be used to assess code duration 506. In addition if the code is executed under an interrupt, which occurs randomly based on a HW timer, the frequency of occurrence can also be configured at runtime. Generic deterministic techniques may exploit calls at fixed locations 508 and interrupts 510 that may assess the interrupt frequency 512. Insofar as ad-hoc techniques 514 are concerned, examples include checks for inconsistent status 516 (such as where a value is never assigned), checks for inconsistent lengths after a loop 518 or various other ad hoc techniques 520.

Figure 6:
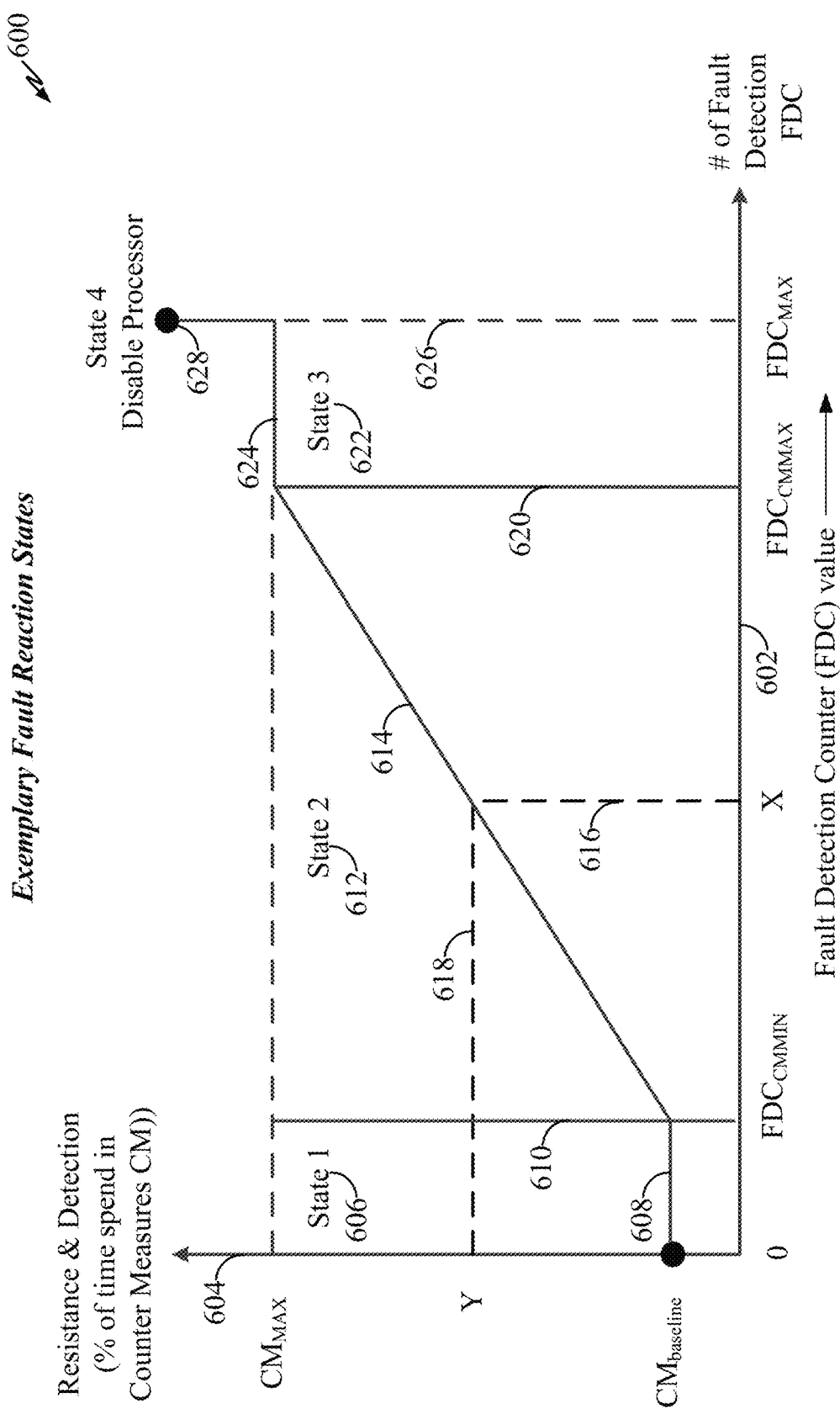
FIG. 6 illustrates exemplary fault reaction states.

FIG. 6 illustrates exemplary defensive reaction states by way of graph 600, which shows four reaction states (State 1-State 4). Within the graph, the x-axis 602 shows a value for a fault detection counter (FDC), which counts a number of detected faults and is incremented and decremented as described below. The y-axis 604 of the graph shows the relative percentage of time spent by the processor while performing various countermeasures (CM). In State 1 (606), the processor performs countermeasures at a baseline or default level ($CM_{baseline}$), 608. Once the FDC reaches a lower threshold ($FDC_{CMMIN}$), 610, the processor enters State 2 (612) during which the countermeasures become increasingly aggressive by scaling the countermeasures with increasing FDC, as shown by increasing line 614. Within State 2, for a given value X (616) of the FDC, a percentage Y (618) of device resources is devoted to countermeasures. In the presence of an ongoing attack, the FDC will continue to rise until it reaches a higher threshold ($FDC_{CMMAX}$), 620, that triggers entry into State 3 (622) where the maximum level of countermeasures ($CM_{MAX}$), 624, are employed. If the FDC still continues to rise, it will reach an upper threshold ($FDC_{CMMAX}$), 626, that triggers State 4 where the processor (or components thereof such as a secure processor sub-system (SPSS)) are disabled, 628. As noted, this may be a cold reset. Note that in embodiments where three thresholds are used, the $FDC_{CMMAX}$ threshold may be referred to as a "middle threshold." Note also that, although not shown in FIG. 6, the software logs the on-going attack attempt in order to enable adaptive defense strategies (of the types described in more detail below). Moreover, as will be explained, a tracking interval may be employed that triggers a decrement in the FDC if additional faults are not detected within the tracking interval. Hence, the FDC value may not always increase monotonically (as is shown in FIG. 6) but may instead decrease in time, triggering a reduction in countermeasures. Note also that the different States may represent different ratios of countermeasures to functional code processing. Within State 1, the ratio is represented as $CM_{baseline}$. Within State 2, the ratio is represented as Y. Within State 3, the ratio is represented as $CM_{MAX}$. Within State 4, where the processor is disabled, the ratio may be regarded as substantially "infinite" since there is no functional code being performed and so the denominator of the ratio is zero.

Table I summarizes the four states of FIG. 6 and their corresponding ratios:

TABLE I

| State | FDC | CM/Functional code ratio | Comments |
|---|---|---|---|
| 1 | FDC < $FDC_{CMMIN}$ | $CM_{baseline}$ | Processor running in normal condition |
| 2 | $FDC_{CMMIN}$ < FDC < $FDC_{CMMAX}$ | Y | Processor under attack, ramping CM |
| 3 | $FDC_{CMMAX}$ < FDC < $FDC_{MAX}$ | $CM_{MAX}$ | $CM_{MAX}$ reached |
| 4 | $FDC_{MAX}$ | ∞ | Processor is disabled |

Figure 7:
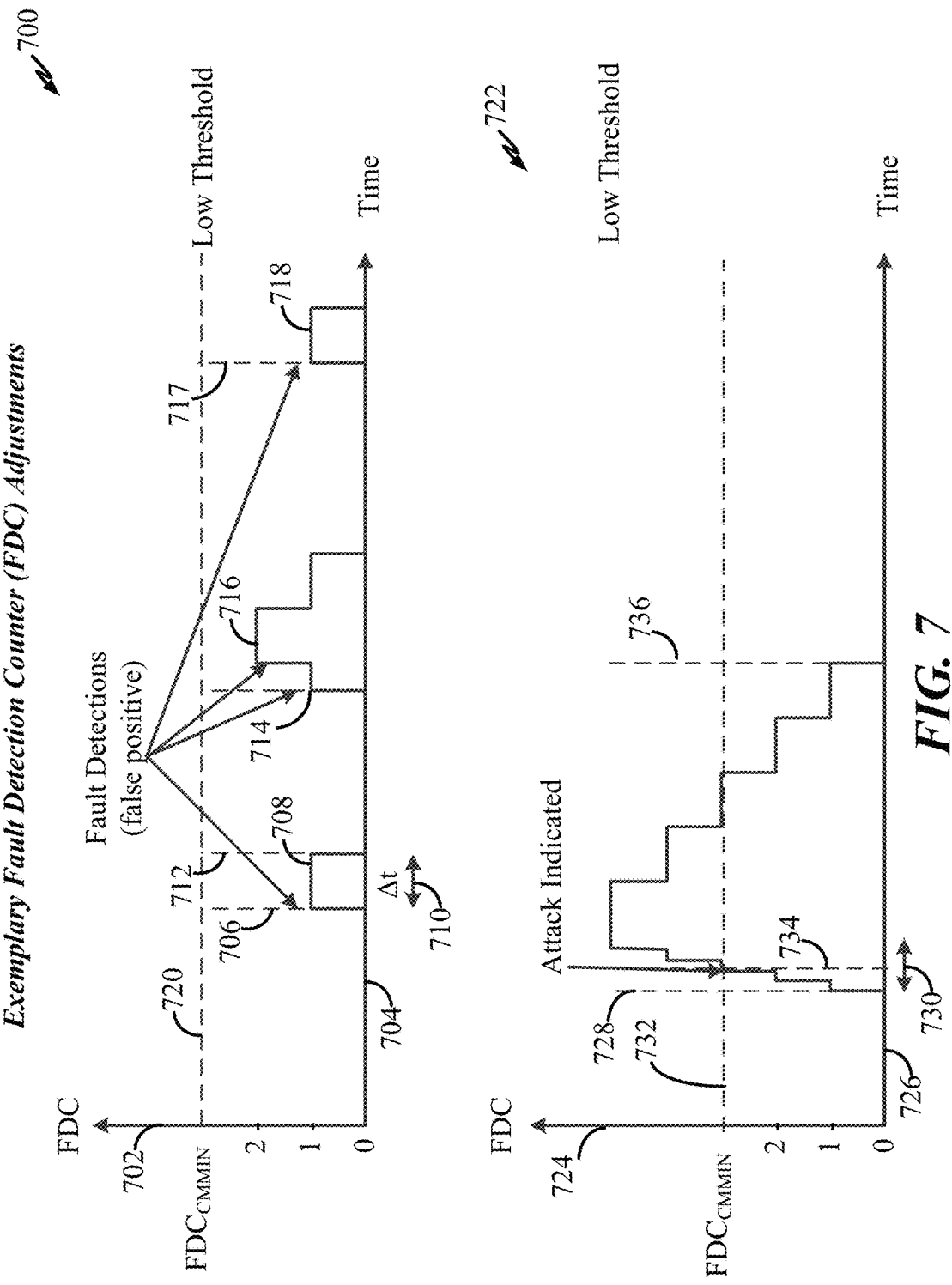
FIG. 7 illustrates exemplary fault detection counter (FDC) adjustments.

FIG. 7 illustrates exemplary changes in the FDC value under different conditions and, in particular, shows how the FDC may be selectively decremented. In this regard, in order to cope with "unfriendly environments" that result in fault detections (e.g. environmentally-induced glitches) unrelated to malicious attacks, the processor allows for the FDC to slowly decrease back to zero if the processor is not under attack. A first graph 700 of FIG. 7 illustrates an example with no on-going attack (i.e. the fault detections are false positives). More specifically, a graph 700 shows the FDC value on a y-axis 702 as the FDC changes over time, as represented by an x-axis 704. A fault detection at a first time 706 causes the FDC to increment from 0 to 1 (as denoted by a first FDC value 708). In this example, no further faults are detected during a time interval ΔT 710 (which is the time needed to "recover" from one fault), causing the FDC to then be decremented at a second time 712 back to 0. Later, beginning at a third time 714, a pair of consecutive fault detections cause the FDC to increment from 0 to 1 and then from 1 to 2 (as denoted by a second FDC value 716). Again, however, no further faults are detected during the ensuing ΔT time interval, causing the FDC to then be decremented back to 1 and then back to 0. Yet another fault detection, third FDC value 718 at a fourth time 717, causes a temporary increment of the FDC to 1 before it is reset to 0. In this example, the FDC never reaches the low threshold $FDC_{CMMIN}$, 720, and so no increase in countermeasures is triggered. That is, the processor remains entirely within State 1 (FIG. 6) and the various faults are regarded as false positives triggered, e.g., by random ambient "noise."

A second graph 722 of FIG. 7 illustrates an example of an on-going attack. FDC values are shown on a y-axis 724 as the FDC changes over time, as shown by an x-axis 726. A series of closely consecutive fault detections beginning at a fifth time 728 within time interval ΔT (730) cause the FDC to quickly increment up to the low threshold 732, indicating an on-going attack attempt and triggering entry into State 2 (FIG. 6) at a sixth time 734. Beginning at the sixth time 734, countermeasures are increased in aggressiveness, as already discussed. In this particular example, the increased countermeasures serve to thwart the attack by preventing further faults from being successfully injected. Hence, at the end of each ensuing time interval ΔT, the FDC is decremented until the FDC again reaches 0 at a seventh time 736. In this example, it is assumed that the attacker abandoned the attack sometime after the sixth time 734 since the attack ceased to successfully inject additional faults and so no further faults are detected. If the attacker were instead to resume the attack, the processor would then detect the new series of faults (not shown in FIG. 7) and again quickly increase the aggressiveness of the countermeasures. Still further, as already discussed, if the attack continued and the increasingly aggressive countermeasures failed to thwart the attack, the processor would ultimately be pushed to State 4 (FIG. 6), triggering disablement.

Thus, FIGS. 2-7 illustrate various adaptive defensive strategies, procedures and systems. In the following, more detailed examples are set forth.

Exemplary System-on-a-Chip Hardware Environment

The systems and procedures described herein can be exploited in a wide range of devices. To provide a concrete example, an exemplary hardware environment will now be described wherein components are provided on a system-on-a-chip (SoC) processing circuit for use in a mobile communication device or other access terminal.

Figure 8:
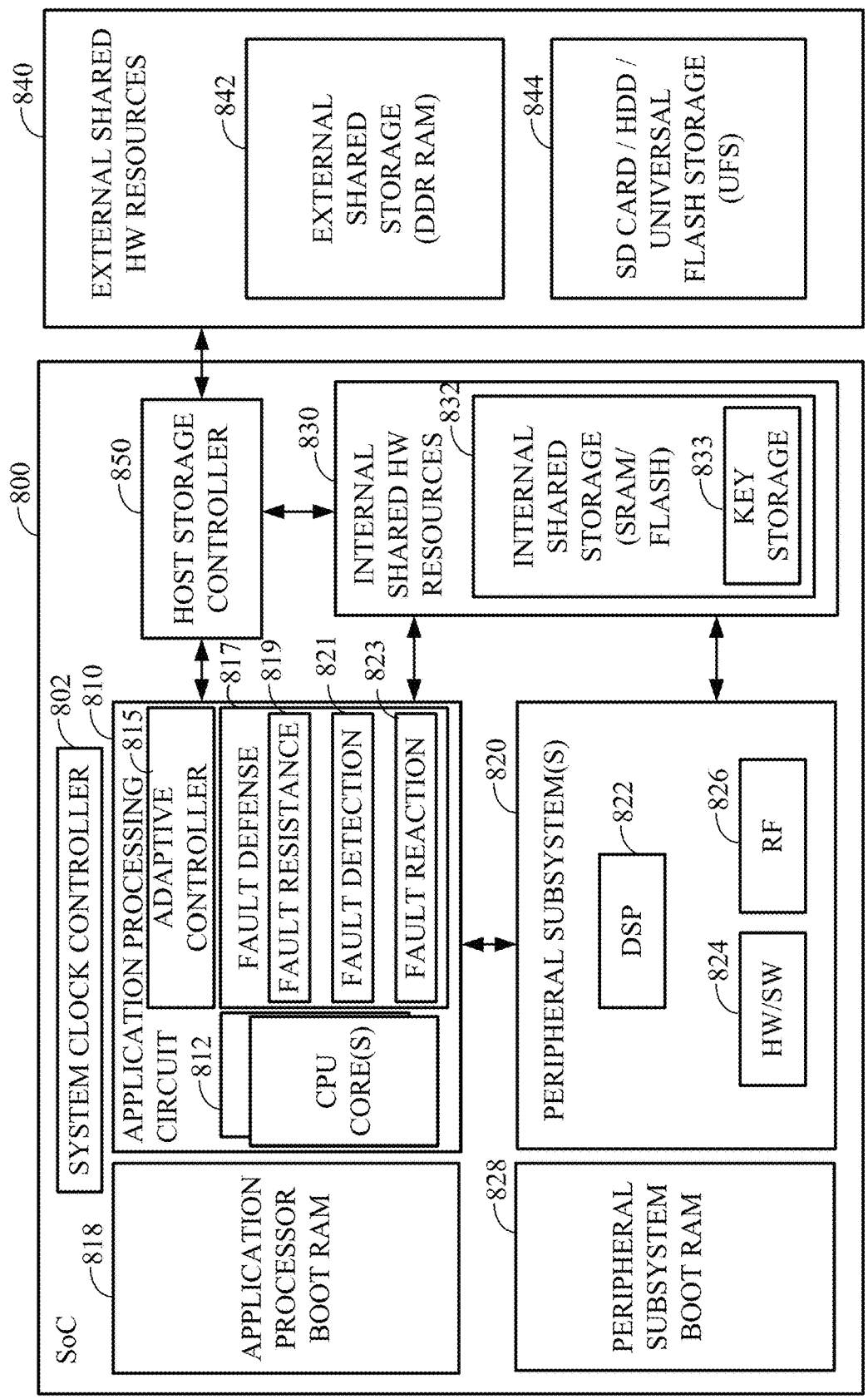
FIG. 8 illustrates an exemplary system-on-a-chip (SoC) of a smartphone equipped with an adaptive defense system for defending against transient fault attacks.

FIG. 8 illustrates a SoC processing circuit 800 of a mobile communication device in accordance with one example where various novel features may be exploited. The SoC processing circuit may be a Snapdragon™ processing circuit of Qualcomm Incorporated, modified to incorporate the various additional components and features described herein. The SoC processing circuit 800 includes, in this example, a system clock controller 802 that provides a clock signal for all components of the SoC, including an application processing circuit 810 having a multi-core CPU 812. The application processing circuit 810 includes an adaptive controller 815 that controls operations of a fault defense system 817 that are directed to defending against transient fault attacks. In this example, the fault defense system 817 includes a fault resistance system 819, a fault detection system 821 and a fault reaction system 823, which may perform or control procedures corresponding to those shown in FIGS. 2-7 (and other procedures discussed below). As will be explained below, the adaptive controller 815 can also selectively and adaptively control the system clock controller 802 and/or other components of the SoC or peripheral systems (e.g. an SPSS, not shown in FIG. 8) to intelligently defend against transient fault attacks. The transient fault detection system 821 may include various Software Fault Sensors (SFS). The adaptive controller 815, the fault defense system 817, and their various components can be implemented in hardware and/or software, depending on the particular implementation. Note also that, in some examples, faults may additionally or alternatively be detected by a peripheral fault sensor, which is not part of the SoC.

Note also that the application processing circuit 810 typically controls the operation of all components of the mobile communication device. In one aspect, the application processing circuit 810 is coupled to a host storage controller 850 for controlling storage of data, including storage of public and private keys in a key storage element 833 of an internal shared storage device 832 that forms part of internal shared HW resources 830. A transient fault attack may seek to obtain the secret keys stored in key storage 833 by injecting faults somewhere within the circuitry of the SoC 800 in a manner sufficient to induce a host system program running on the CPU cores 812 to make erroneous processing decisions that would reveal the keys. The adaptive controller 815 operates to hinder or thwart those attacks, using systems and procedures described in detail below, and with limited or minimal disruption to the user of the smartphone in which the SoC 800 is incorporated.

The application processing circuit 810 may also include a boot ROM 818 that stores boot sequence instructions for the various components of the SoC processing circuit 800. The SoC processing circuit 800 further includes one or more peripheral subsystems 820 controlled by application processing circuit 810. The peripheral subsystems 820 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., other encryption components and digital rights management (DRM) components), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 4G Long Term Evolution (LTE) modems). The exemplary peripheral subsystem 820, which is a modem subsystem, includes a DSP 822, various other HW and SW components 824, and various radio-frequency (RF) components 826. In one aspect, each peripheral subsystem 820 also includes a boot ROM 828 that stores a primary boot image (not shown) of the associated peripheral subsystems 820.

As noted, the SoC processing circuit 800 further includes various internal shared HW resources 830, such as an internal shared storage 832 (e.g. static RAM (SRAM), flash memory, etc.), which is shared by the application processing circuit 810 and the various peripheral subsystems 820 to store various runtime data or other parameters and to provide host memory. In the example of FIG. 8, the internal shared storage 832 includes the aforementioned key storage component 833 that may be used to store public and private keys or other sensitive information. In other examples, keys are stored elsewhere within the mobile device.

In one aspect, components 810, 818, 820, 828 and 830 of the SoC 800 are integrated on a single-chip substrate. The SoC processing circuit 800 further includes various external shared HW resources 840, which may be located on a different chip substrate and may communicate with the SoC processing circuit 800 via one or more buses. External shared HW resources 840 may include, for example, an external shared storage 842 (e.g. double-data rate (DDR) dynamic RAM) and/or permanent or semi-permanent data storage 844 (e.g., a secure digital (SD) card, hard disk drive (HDD), an embedded multimedia card, a universal flash device (UFS), etc.), which may be shared by the application processing circuit 810 and the various peripheral subsystems 820 to store various types of data, such as an operating system (OS) information, system files, programs, applications, user data, audio/video files, etc.

Exemplary Adaptive Procedures for Defending Against Transient Faults Attacks

Figure 9:
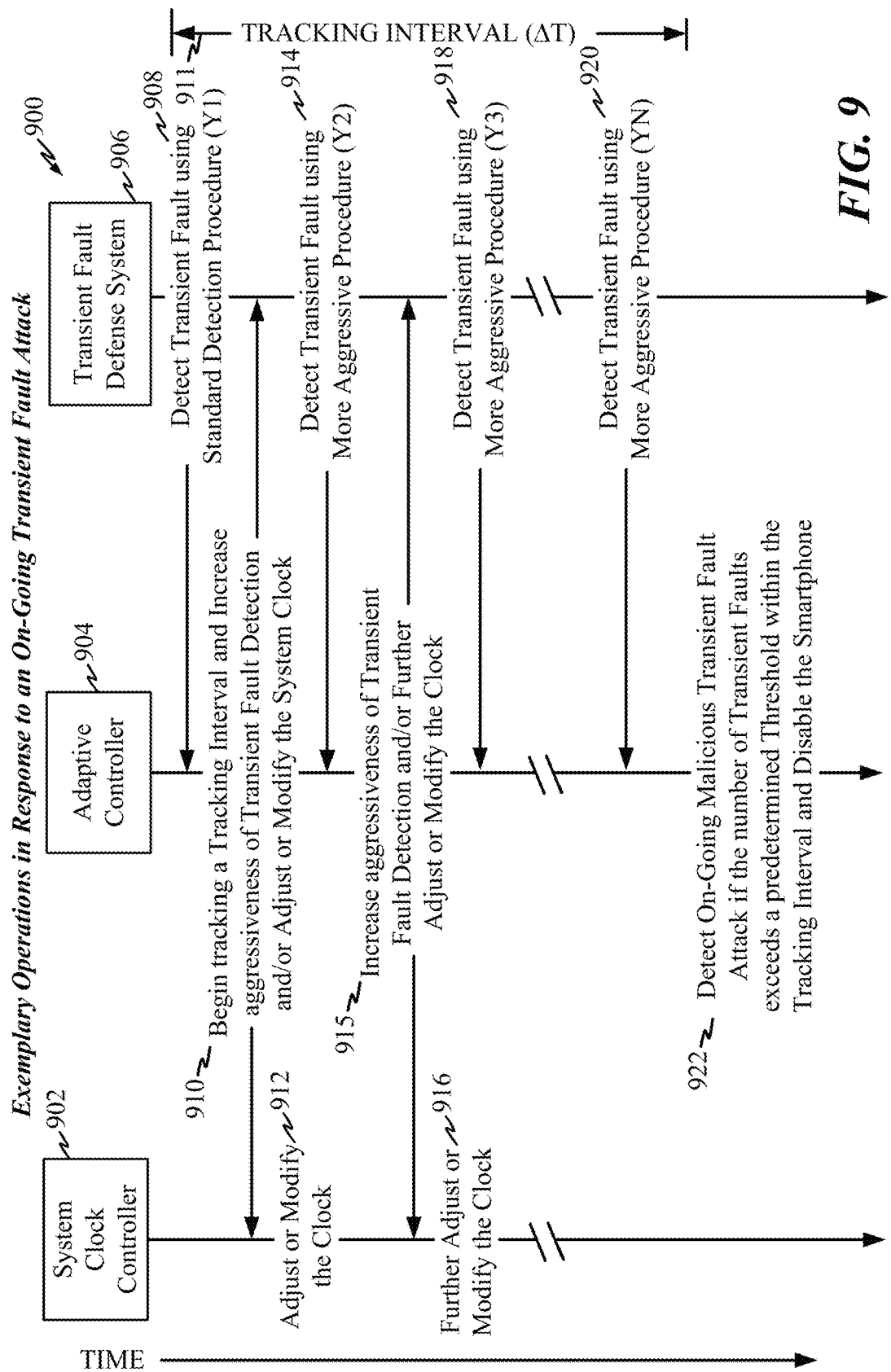
FIG. 9 illustrates exemplary operations of an adaptive defense system in response to an on-going transient fault attack.

FIG. 9 provides a timing diagram 900 illustrating exemplary operations of components of a smartphone or other device in response to an on-going transient fault attack, including operations performed by a system clock controller 902, an adaptive controller 904 and a transient fault defense system 906 (which may include transient fault resistance, transient fault detection and transient fault reaction components) and particularly illustrating information and control signals exchanged there-between for use in defending the smartphone against the attack. Adaptive fault defense may include various functions such as adjusting various clock frequencies with increased randomness and/or adjusting various software random delays to increase an amount of delay, which will be described in greater detail below. In some examples, the operations of components 902, 904 and/or 906 are adjusted based on a fault detection counter (FDC) to control an amount of time (Y) spent in fault defense, such as by adjusting Y as a function of the FDC (i.e. Y=f(FDC) where Y might therefore be set to Y1, Y2 or Y3 . . . YN with X1<X2<X3<YN to thereby control the level of aggressiveness).

At 908, the transient fault defense system 906 detects a transient fault and sends an indication of the fault to the adaptive controller 904 via internal connection lines of the SoC. The transient fault defense system 906 may use any suitable procedure to detect a transient fault, including otherwise conventional fault detection procedures or novel procedures. (See, e.g., the detection procedures discussed above in connection with FIG. 5.) In one example, a transient fault is detected by running a standard, baseline or default SFS fault detection procedure to detect checksum errors or the like that might arise due to a transient fault. For example, the transient fault defense system 906 may be equipped to periodically calculate a mathematical function (such as by calculating π to some predetermined degree of precision) and then compare the result with the known (correct) result. If there is no match, a fault is thereby detected, at 908. The baseline or default procedure might consume Y1 resources of the device, where Y1 represents a certain percentage of processing resources, such as 1%.

Figure 10:
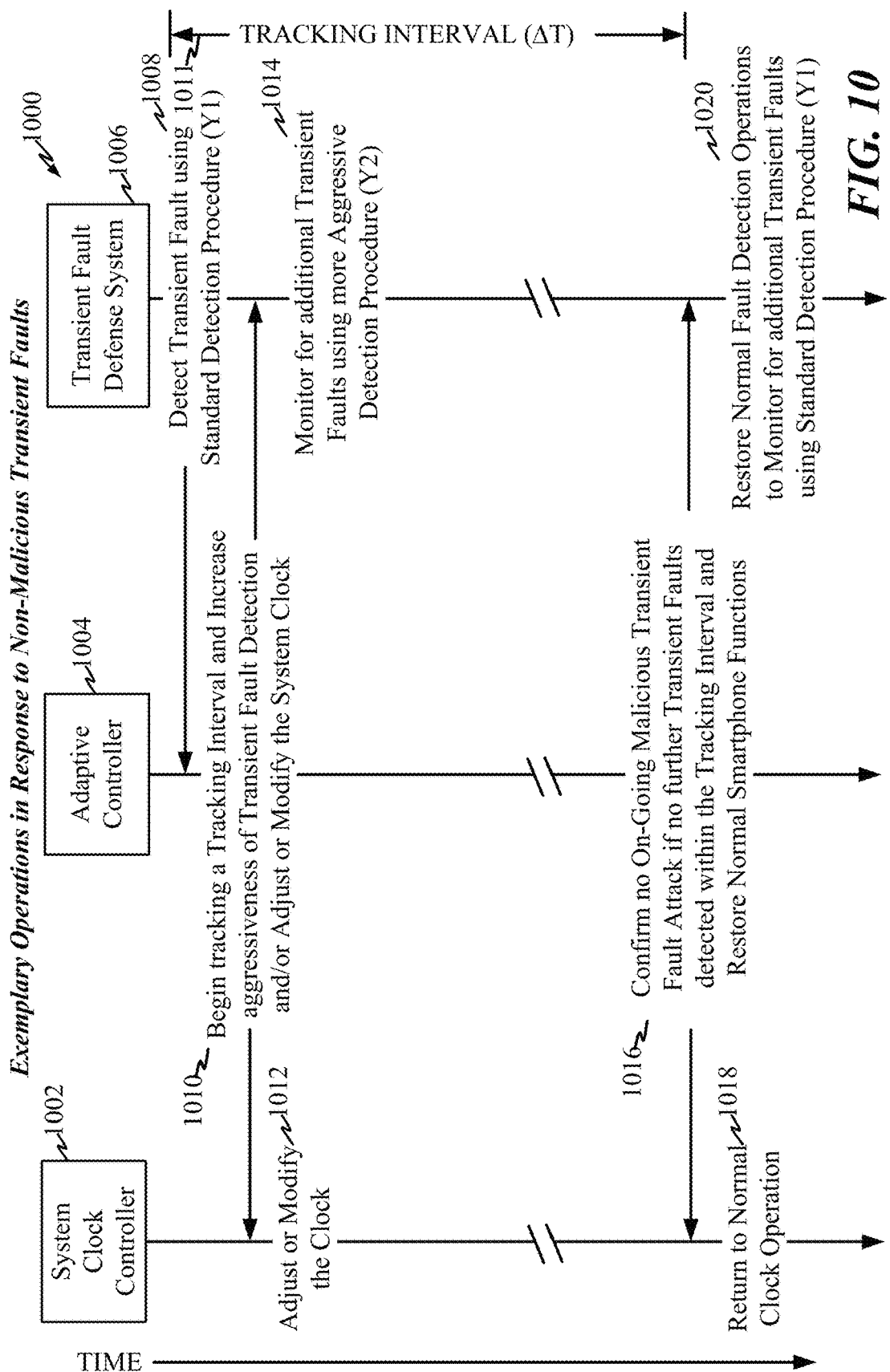
FIG. 10 illustrates exemplary operations of an adaptive defense system in response to non-malicious transient faults.

In response to the detection of the fault, at 910, the adaptive controller 904 begins to track a tracking interval 911 (ΔT) that is used to help determine whether a malicious attack is on-going (in which case the SPSS of the smartphone will be disabled) or whether no malicious attack is on-going (in which case normal device operations will be restored as shown in FIG. 10, discussed below). The tracking interval 911 (ΔT) may be set to a predetermined or adjustable value based, e.g., on how frequently transient faults are expected to occur due to normal factors in the absence of a malicious attack and how frequently they are expected to occur in the presence of a malicious attack. In some examples, a suitable value for the tracking interval might be, e.g., one minute.

At 910, the adaptive controller 904 also increases an aggressiveness of the transient fault defense and/or adjusts or modifies the system clock. Various techniques are described in detail below for increasing the aggressiveness of transient fault defense. For the purposes of FIG. 9, note that the adaptive controller, depending upon its programming, can increase the aggressiveness of the transient fault defense by sending a signal to the transient fault defense system 906 to adjust a control parameter that controls a functional operation of the transient fault defense system 906. As noted, the control parameter can control a percentage of device resources devoted to fault defense (e.g. if the processor ordinarily devotes Y1% of its time to running fault detection or resistance procedures, that percentage may be adaptively increased to Y2% wherein Y2% is 10%, 50%, 90%, etc.). As another example, the control parameter controls a frequency (f) with which the fault defense system or its components are activated (e.g. once every second, once every millisecond, once every microsecond, etc.). As yet another example, the control parameter selects a particular fault detection SFS procedure to be used (if the transient fault defense system is equipped to control or perform various selectable fault detection SFS procedures, some of which are more thorough or more sophisticated than others). Insofar as adjusting or modifying the system clock, the adaptive controller 904, depending upon its programming, can selectively increase or decrease the clock rate (to thereby affect the time localization of events within the SoC processor to hinder transient fault attacks that rely on time localization) and/or selectively skip or gate clock cycles (to thereby also affect the time localization of events within the SoC processor), including gating clock cycles by generating a random or pseudorandom hash that specifies the particular cycles to skip. The system clock controller 902 responds, at 912, by adjusting or modifying the system clock, as instructed.

In the example of FIG. 9, since there is an on-going transient fault attack, another transient fault is promptly detected within the tracking interval using the more aggressive detection procedures, at 914. The more aggressive procedure employed at 914 might consume Y2 resources of the device, where Y2 is greater than Y. The adaptive controller 904 then increases the aggressiveness yet again, at 915, and/or further modifies or adjusts the system clock. If the latter, the system clock controller 902 responds, as instructed, at 916. The fault defense system 906 then uses a still more aggressive defense procedure at 918. The more aggressive procedure employed at 918 might consume Y3 resources of the device, where Y3 is greater than X2.

Eventually, assuming that the transient fault attack continues, a sufficient number of transient faults will be detected within the tracking interval to trigger automatic disablement of the SoC. That is, at 920, a transient fault will be detected (while using a procedure that consumes, for example, YN resources) that will exceed a predetermined threshold indicative of an on-going attack. In response, at 922, the adaptive controller 904 detects the on-going malicious transient fault attack (if the number of transient faults exceeds the predetermined threshold within the tracking interval) and disables the smartphone. As explained above in connection with FIG. 6, multiple thresholds may be used.

FIG. 10 provides a timing diagram 1000 illustrating exemplary operations of components of the smartphone or other device in response to a non-malicious transient faults, such as faults caused by ambient radiation or otherwise innocent glitches. As with FIG. 9, FIG. 10 separately illustrates operations performed by a system clock controller 1002, an adaptive controller 1004 and a transient fault defense system 1006. At 1008, the transient fault defense system 1006 detects a transient fault and sends an indication of the fault to the adaptive controller 1004. The transient fault defense system 1006 may again use any suitable procedure to detect a transient fault, such as a baseline or default procedure that consumes Y1 resources. In response to the detection of the fault, at 1010, the adaptive controller 1004 begins to track the tracking interval 1011 (which may be set to the same duration ΔT as in FIG. 9) and increases an aggressiveness of the transient fault defense system 1006 to Y2 and/or adjusts or modifies the system clock. The system clock controller 1002 responds, at 1012, by adjusting or modifying the system clock, as instructed. The transient fault defense system 1006 responds, at 1014, by monitoring for additional transient faults using the more aggressive detection procedure.

In the example of FIG. 10, there is no on-going transient fault attack, and so no further transient faults are detected within the tracking interval 1011, despite the more aggressive detection procedures. Accordingly, at 1016, upon expiration of the tracking interval 1011, the adaptive controller 1004 determines, confirms or concludes that there is no on-going malicious transient fault attack (since no further transient faults were detected within the tracking interval) and restores normal smartphone functions. The system clock controller 1002 responds, at 1018, by restoring normal clock operations. The transient fault defense system 1006 responds, at 1020, by restoring normal fault defense operations and then monitoring for additional transient faults using its standard, default or otherwise normal SFS detection procedures (e.g. Y1). Again, multiple thresholds may be used, as shown in FIG. 6.

Hence, as illustrated in FIGS. 9 and 10, in the presence of an on-going transient fault attack, the number of detected faults will escalate quickly because more aggressive fault detection procedures are automatically triggered, likely resulting in prompt disablement of the smartphone. However, in the absence of an on-going transient fault attack, normal device operations are soon restored. In this manner, it is highly unlikely that transient faults arising from natural or innocent sources will ever trigger disablement of the smartphone. It is also highly unlikely that a transient fault attack will be successful since the smartphone will be promptly disabled before the account can complete. Moreover, by increasing the aggressiveness of the fault defenses (including detection and/or resistance) in response to a transient fault, greater resources of the smartphone are thereby devoted to monitoring for faults, effectively slowing down other processes that are running on the SoC of the smartphone that a particular malicious attacker might target in order to complete the attack. That is, the systems and procedures of FIGS. 9 and 10 serve to (a) make a transient fault attack more time consuming and/or (b) greatly increase the likelihood that the smartphone under attack will automatically disable itself before the attacker can complete the attack, thereby discouraging or preventing such attacks.

FIG. 11 further illustrates exemplary operations that may be performed by a processor device (such as the SoC of a smartphone) in response to transient faults. At 1102, the processor device detects a transient fault within the processor device using the SFS components of a fault detection system, logs the time, increments the FDC and begins tracking a tracking interval. The fault detection system may include a set of selectable fault detection components or procedures (e.g. selectable SFS components), some of which are more sophisticated or more thorough than others. Generally speaking, the detection procedures that are more sophisticated will consume more of the resources of the processor to the exclusion of other processes, and hence may have the effect of slowing down the performance or completion of the other processes. As noted above, this, in turn, may have the effect of making a transient fault attack more difficult since the attack will likely take longer to complete. Initially, at 1102, a standard or default SFS fault detection procedure is used that does not consume inordinate resources, i.e. a relatively unsophisticated baseline SFS may be employed.

At 1104, in response to the detected fault, the processor device adaptively adjusts one or more of features of the processor device and/or a peripheral fault detection system. For example, the percentage of processor device resources devoted to fault detection and/or resistance may be increased. As noted, if the processor ordinarily devotes Y1% of its time to running fault detection procedures, that percentage may be adaptively increased to Y2% to, for example, devote twice the percentage of resources to fault detection as before. The adjustment may be based on the FDC, with the value of Y set as a function of FDC, i.e., Y=f(FDC). Depending upon the capabilities of the particular processor device, this may be achieved by changing the allocation of processor resources using otherwise conventional system tools or interrupts or by changing the priority or duration of the fault detection process relative to other processes. As another adjustment example, the frequency with which the fault detection system is activated is increased. For example, if the fault detection process is ordinarily activated every N number of clock cycles, N can be decreased to activate the process more often or more frequently. As yet another example, any of the thresholds used for a malicious attack detection may be adjusted. For example, if N number of transient faults within M clock cycles is ordinarily used for determining whether to disable the processor, the value of N can be adaptively reduced. As yet another example, any counters used for malicious attack detection can be selectively incremented in response to each new transient fault detected within the tracking interval. As another example, the particular fault detection and/or resistance system(s), procedure(s) or component(s) that are activated by the processor device can be changed to employ more sophisticated or more thorough fault detection procedures by, e.g., activating a more thorough SFS. As still another example, the clock of the processor device can be adjusted to help prevent attacks that rely on time localization. Particular examples are discussed below wherein a ratio of gated clock cycles to non-gated cycles is adaptively adjusted. As still yet another example, the particular timing of activation of selected processes relative to other processes of the processor device may be changed or adjusted. Again, depending upon the capabilities of the processor device, this may be achieved using programmable system tools or interrupts. This too can help thwart attacks that rely on time localization.

At 1106, the processor device detects or tracks the amount of time since a last transient fault. At 1108, the processor device then detects and counts any additional faults (using the FDC) and further adjusts one or more of the parameters listed above to (a) make fault defense more aggressive whenever one or more new transient faults are detected within the tracking interval and to (b) make fault defense less aggressive if a new transient fault is not detected within the tracking interval. In some examples, after a tracking interval of T hours without any fault detection, the FDC is decremented. At 1110, the processor device disables itself if the count of faults exceeds a suitable threshold (e.g. if the FDC exceeds the above-described $CM_{MAX}$ threshold before the FDC is again decremented at the end of tracking interval $\Delta T$) or if a malicious attack is otherwise detected or confirmed.

FIG. 12 illustrates various exemplary clock adjustments or modifications that can be controlled by the adaptive controller 815 of FIG. 8 or by other suitably equipped circuits or devices to, for example, adaptively adjust a ratio of gated clock cycles to non-gated clock cycles. A default clock 1202 is illustrated, which can be, for example, a 8.5 GHz clock. In response to the detection of a first new transient fault, the clock rate might be slowed to half its rate, as indicated by slowed clock 1204. This can help thwart malicious attacks that rely on the precise timing of injection of transient faults since the processor will then be operating a different rate than the rate that the attacker assumes the processor is using. Hence, attacks that depend on time localization may be hindered or thwarted. Moreover, depending upon the particular attack, by slowing the clock to half its rate, the malicious attack may then take twice as long. Additional transient faults may then be used to trigger still further reductions in clock rate, perhaps down to a slowest rate accommodated by the particular processor. In some examples, in the presence of an on-going attack, the rate might eventually be reduced by a factor of ten. As such, an attack that would otherwise require an hour to have a good chance of successfully tricking the system into revealing the desired information might instead take ten hours, which might be deemed by the attacker to be too long to be worthwhile (depending upon the value of the information to be obtained from the device). Note that, in the absence of an on-going attack, any slowdown of the system clock will be only temporary and not likely even noticed by the user.

FIG. 12 also illustrates the use of a random or pseudorandom hash function 1206 to hash the clock 1202 to yield a gated clock 1208 with a selected ratio of gated to non-gated clock cycles. The hash or gating pattern or function 1206 may be generated by a pseudorandom number generator (PRNG) and applied to gate or skip some clock cycles while retaining others (as shown) where, in some examples, the PRNG is controlled to provide a selected ratio of 1's to 0's. Assuming the processor (and the overall smartphone it is installed in) can operate properly with a gated clock, the effect will be to randomly offset or delay the timing of processes running on the processor to hinder or thwart any time localization attack. The gated clock is also a relatively slower clock compared to the default clock and so the considerations discussed above again apply, since the overall slower operation of the processor can discourage attacks by making them longer to complete. Again, in the absence of an on-going attack, any gating of the clock will be only temporary and not likely even noticed by the user. In at least some examples, the adaptive strategy controls the ratio of 1's and 0's in hash 1206. For example, default might be 50% of 1's (50% of clock cycles are kept) but as more and more faults are detected, the adaptive strategy changes the parameter of the clock controller to increase the ratio of 0's relative to 1's, which will slow down the system and thereby move a target process to a new position in time, therefore hindering the fault attack process.

FIG. 13 illustrates in more detail a particular exemplary process that may be employed by a processing device, which exploits some of the features already discussed. In particular, FIG. 13 sets forth a procedure using upper and lower thresholds for comparison against the FDC. Briefly, if the FDC<Low Threshold (e.g. $FDC_{CMMIN}$), no changes in processor allocation are performed. If Low Threshold<FDC<High Threshold (e.g. $FDC_{CMMAX}$), the device increases a percentage of processor resources devoted to defense as a function of the value of the FDC (e.g., the greater the FDC, the greater the percentage). If High Threshold<FDC, the processor is disabled (or, as in the example of FIG. 6, discussed above, a still higher threshold of $FDC_{MAX}$ may be used to trigger the disablement of the device and, if so, the High Threshold of FIG. 13 is actually a middle threshold). The low threshold allows the device to ignore infrequent glitches completely (since the FDC will be decremented before it reaches the low threshold within a tracking interval). Hence, adjustments to processor allocation only occur if a sufficient number of fault detections occur within the tracking interval to justify a change in allocation, as already explained.

At 1302, the processing device monitors for transient faults using an SFS and, upon detection of a fault, increments the FDC, logs the time and begins tracking a Tracking Interval. At 1304, the processing device compares the FDC to a Lower Threshold to determine if it exceeds the Lower Threshold within the Tracking Interval and, if so, the processor device increases the percentage of processor device resources devoted to the SFS and continues to monitor for faults using the SFS. If another fault is not detected during the tracking interval, as determined at 1306, the processing device decrements the FDC and resets the Tracking Interval, at 1308. Processing then returns to 1302 to monitor for a new fault. This represents the normal operation of the processing device in the absence of an on-going attack, when transient faults are relatively infrequent. On the other hand, if at 1306 another fault is detected within the Tracking Interval, the processing device increments the FDC, at 1310, and compares the counter to an Upper (Attack) Detection Threshold. Assuming the FDC has not yet exceeded the Upper Threshold, as determined at 1312, processing returns to 1304 where the percentage of processor device resources devoted to the SFS is increased if the FDC exceeds the Lower Threshold. If the FDC eventually also exceeds the Upper Threshold, as determined at 1312, the processor is disabled, at 1314. This represents the response of the processing device in the presence of an on-going attack, when transient faults are frequent.

FIG. 14 broadly summarizes the "virtuous cycle" that may be achieved using one or more of the procedures described herein. Briefly, the detection of a fault at 1402 triggers, at 1404, an increase in the fault detection capabilities and/or aggressiveness. This in turn helps detect newly injected faults, at 1402, leading to still further increases in detection capabilities and/or aggressiveness, at 1404. An on-going malicious attack thereby leads to a quick escalation of detection capabilities and then disablement of the device to prevent loss of sensitive information such as security keys or passwords. It is noted that other countermeasures may be implemented besides full disablement of the processor of the smartphone, such as erasure of sensitive information or resetting of the processor.

Exemplary Devices and Methods

FIG. 15 illustrates an overall system or apparatus 1500 in which the systems, methods and apparatus of FIGS. 2-14 may be implemented. In accordance with various aspects of the disclosure, an element, or any portion of an element, or any combination of elements may be implemented with a processing system 1514 that includes one or more processing circuits 1504. For example, apparatus 1500 may be a user equipment (UE), such as a smartphone, of a mobile communication system and may be used in connection with a radio network controller (RNC), not separately shown. In some examples, the processing circuit 1504 is implemented as an SoC (such as the SoC of FIG. 8). In addition to an SoC, examples of suitable processing circuits 1504 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1504, as utilized in the apparatus 1500, may be used to implement any one or more of the processes described above and illustrated in FIGS. 2, 3, 4, 5, 6, 7, 8, 9, 10, 11, 12, 13 and 14 (and those illustrated in FIGS. 16, 17, 18, 19, 20, 21, 22, 23 and 24, discussed below).

In the example of FIG. 15, the processing system 1514 is implemented with a bus architecture, represented generally by the bus 1502. The bus 1502 may include any number of interconnecting buses and bridges depending on the specific application of the processing system 1514 and the overall design constraints. The bus 1502 links various circuits including one or more processing circuits (represented generally by the processing circuit 1504), the storage device 1505, and a machine-readable, processor-readable, processing circuit-readable or computer-readable media (represented generally by a non-transitory machine-readable medium 1506.) The bus 1502 may also link various other circuits such as timing sources, peripherals, voltage regulators, and power management circuits, which are well known in the art, and therefore, will not be described any further. The bus interface 1508 provides an interface between bus 1502 and a transceiver 1510. The transceiver 1510 provides a means for communicating with various other apparatus over a transmission medium. Depending upon the nature of the apparatus, a user interface 1512 (e.g., keypad, display, speaker, microphone, joystick) may also be provided. The processing circuit 1504 is responsible for managing the bus 1502 and for general processing, including the execution of software stored on the machine-readable medium 1506. The software, when executed by processing circuit 1504, causes processing system 1514 to perform the various functions described herein for any particular apparatus. Machine-readable medium 1506 may also be used for storing data that is manipulated by processing circuit 1504 when executing software.

One or more processing circuits 1504 in the processing system 1514 may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1506. The machine-readable medium 1506 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1506 may reside in the processing system 1514, external to the processing system 1514, or distributed across multiple entities including the processing system 1514. The machine-readable medium 1506 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1506 may have one or more instructions which when executed by the processing circuit 1504 causes the processing circuit to: detect at least one transient fault within the processor circuit using a fault detection system; and adaptively adjust a control parameter, in response to the at least one transient fault, where the control parameter controls one or more of (a) a physical operation of the processor device or (b) a functional operation of the fault detection system so as to devote more processor device resources to transient fault detection.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 1504 may be a specialized processing circuit (e.g., an ASIC)) that is specifically designed and/or hard-wired to perform at least some of the algorithms, methods, and/or blocks described in FIGS. 2, 3, 4, 5, 6, 7, 8, 9, 10, 11, 12, 13 and/or 14 (and/or FIGS. 16, 17, 18, 19, 20, 21, 22, 23 and 24 discussed below) such as those directed to defending against transient fault attacks. Thus, such a specialized processing circuit (e.g., ASIC) may be one example of a means for executing the algorithms, methods, and/or blocks described in FIGS. 2, 3, 4, 5, 6, 7, 8, 9, 10, 11, 12, 13 and/or 14 (and/or FIGS. 16, 17, 18, 19, 20, 21, 22, 23 and 24, discussed below). The machine-readable storage medium may store instructions that when executed by a specialized processing circuit (e.g., ASIC) causes the specialized processing circuit to perform the algorithms, methods, and/or blocks described herein.

FIG. 16 is a block diagram that broadly illustrates selected and exemplary components of a processor device 1600, such as the SoC of a smartphone. The processor device 1600 may include a processing circuit 1612 (e.g., one or more processors) and a communication interface circuit 1614 (to couple the processor device to a bus and/or other devices). The processing circuit 1612 may implement one or more transient fault detection functions, transient fault adaptive control functions, transient fault resistance functions, transient fault reaction functions, and/or fault defense functions. Note that, in various examples, the fault detection system, transient fault control system, and/or the fault defense system may be implemented in software, firmware, and/or embedded code operating in conjunction with hardware/circuits/modules of the processing circuit to implement fault detection functions, transient fault adaptive control functions, transient fault resistance functions, transient fault reaction functions, and/or fault defense functions, respectively. In this example, a transient fault defense system 1602 includes a transient fault resistance system 1604 operative to control or perform fault resistance procedures, a transient fault detection system 1606 operative to control or perform fault detection procedures and a transient fault reaction system 1608 operative to control or perform countermeasures of other fault reaction procedures. A transient fault adaptive control system 1610 is operative to adaptively control the transient fault defense system 1602 or its components to, for example, adaptively adjust a control parameter of the transient fault defense system 1606 in response to transient faults to adaptively control an amount of processor device resources devoted to transient fault defense compared to an amount of processor device resources devoted to other operations.

In some examples, the control parameter is adaptively adjusted to make the transient fault defense system more aggressive in response to more frequent transient faults and less aggressive in response to less frequent transient faults. For example, the control parameter may be adaptively adjusted by: detecting an amount of time since a last transient fault; adjusting the control parameter to increase an amount of time allocated by the processor device to transient fault defense processes compared to an amount of time allocated by the processor device to other processes, if a new transient fault is detected within a tracking interval; and adjusting the control parameter to decrease the amount of time allocated by the processor device to transient fault defense processes compared to the amount of time allocated by the processor device to other processes, if a new transient fault is not detected within a tracking interval.

Still further, in some examples, the control parameter controls one or more of: a percentage of processor device resources devoted to the fault defense system; a frequency with which components of the fault defense system are periodically activated by the processor device; a duration of execution of components of the fault defense system, a threshold used by the fault detection system for transient fault attack detection; a threshold used by a peripheral sensor connected to the processor device for transient fault attack detection; a particular fault detection procedure used to detect a next fault; and/or a timing of at least one process running on the processor device relative to at least one other process. In still other examples, the control parameter of the transient fault defense system is adaptively adjusted by: tracking an amount of time since a last transient fault; increasing a percentage of time devoted by the processor device to defensive countermeasures, if a new transient fault is detected within a tracking interval; and decreasing a percentage of time devoted by the processor device to defensive countermeasures, if a new transient fault is not detected within a tracking interval.

Depending upon the implementation, the functions and operations of the above-described devices and components may be performed by other suitable components that perform the same or similar functions. As such, in some examples, an apparatus, system or device is provided that includes: a means for detecting transient faults within the processor device (e.g., using a fault detection system); and a means for adaptively adjusting a control parameter (e.g., of a transient fault defense system) of the processor device in response to the transient faults to adaptively control an amount of processor device resources devoted to transient fault defense compared to an amount of processor device resources devoted to other operations. The means for adaptively adjusting the control parameter may include means for adaptively adjusting the control parameter to make the transient fault defense system more aggressive in response to more frequent transient faults and less aggressive in response to less frequent transient faults. The means for adaptively adjusting the control parameter may include: means for detecting an amount of time since a last transient fault; means for adjusting the control parameter to increase an amount of time allocated by the processor device to transient fault defense processes compared to an amount of time allocated by the processor device to other processes, if a new transient fault is detected within a tracking interval; and means for adjusting the control parameter to decrease the amount of time allocated by the processor device to transient fault defense processes compared to the amount of time allocated by the processor device to other processes, if a new transient fault is not detected within a tracking interval.

Still further, depending upon the implementation, the functions and operations of the above-described devices and components may be implemented as instructions for use with a machine-readable storage medium. As such, in some examples, instructions are provided which when executed by a processing circuit causes the processing circuit to detect transient faults within the processor circuit (e.g., using a fault detection system) and to adaptively adjust a control parameter (e.g., of a transient fault defense system) of the processor device in response to the transient faults to adaptively control an amount of processor device resources devoted to transient fault defense compared to an amount of processor device resources devoted to other operations.

FIG. 17 is a block diagram that broadly illustrates selected and exemplary components of an alternative processor device 1700, such as the SoC of a smartphone. The processor device 1700 may include a processing circuit 1704 (e.g., one or more processors) and a communication interface circuit 1708 (to couple the processor device to a bus and/or other devices). The processing circuit 1704 may implement one or more transient fault detection functions, transient fault adaptive control functions, and/or fault defense functions. Note that, in various examples, the fault detection system, transient fault control system, and/or the fault defense system may be implemented in software, firmware, and/or embedded code operating in conjunction with hardware/circuits/modules of the processing circuit to implement fault detection functions, adaptive fault control functions, and/or fault defense functions, respectively. In this example, a transient fault defense system 1702 includes a transient fault detection system 1706 operative to control or perform fault detection procedures. A transient fault adaptive control system 1710 is operative to adaptively control a clock system 1712 that has a selectively gateable clock signal to, for example, adaptively adjust the clock signal in response to the transient faults to selectively gate clock cycles. In some examples, the clock signal is adaptively adjusted by applying a hash code to select clock cycles of the clock signal to gate where the hash code is randomly or pseudo-randomly generated. In particular, the clock signal may be adaptively adjusted to control a ratio of gated clock cycles to non-gated clock cycles. In some examples, the clock signal is adaptively adjusted by: detecting an amount of time since a last transient fault; adjusting the control parameter to increase a number of gated clock cycles, if a new transient fault is detected within a tracking interval; and adjusting the control parameter to decrease the number of gated clock cycles, if a new transient fault is not detected within a tracking interval.

Depending upon the implementation, the functions and operations of the above-described devices and components may be performed by other suitable components that perform the same or similar functions. As such, in some examples, an apparatus, system or device is provided that includes: means for detecting transient faults within the processor device (e.g., using a fault detection system); and means for adaptively adjusting a clock signal of the processor device in response to the transient faults to selectively gate clock cycles. The clock signal is adaptively adjusted by applying a hash code to select clock cycles of the clock signal to gate, wherein the hash code is randomly or pseudorandomly generated. In some examples, the clock signal is adaptively adjusted to control a ratio of gated clock cycles to non-gated clock cycles. Also, in some examples, the means for adaptively adjusting the clock signal includes: means detecting an amount of time since a last transient fault; means for adjusting the control parameter to increase a number of gated clock cycles, if a new transient fault is detected within a tracking interval; and means adjusting the control parameter to decrease the number of gated clock cycles, if a new transient fault is not detected within a tracking interval.

Still further, depending upon the implementation, the functions and operations of the above-described devices and components may be implemented as instructions for use with a machine-readable storage medium. As such, in some examples, instructions are provided which when executed by a processing circuit causes the processing circuit to detect transient faults within the processor circuit (e.g., using a fault detection system) and to adaptively adjust a clock signal of the processor device in response to the transient faults to selectively gate clock cycles.

FIG. 18 is a block diagram illustrating selected and exemplary components of yet another exemplary processor device 1800, such as the SoC of a smartphone. The processor device 1800 includes, in this example, a transient fault/perturbation detection system 1802 operative to detect at least one transient fault or perturbation within the processor device 1800 (and which may include, e.g. one or more SFSs). A fault resistance system 1803 is operative to control fault resistance procedures. (Collectively, the detection system 1802, the fault resistance system 1803 and the various components of FIG. 18 equipped to perform or control countermeasures may be regarded as a fault defense system, as shown in FIG. 16, discussed above.) In one example, the systems illustrated in FIG. 18 may be implemented by the processing circuit 1704 illustrated in FIG. 17.

An adaptive control system 1804 is coupled to the fault/perturbation detection system 1802 and/or the fault resistance system 1803 and is adapted to adaptively adjust a control parameter, in response to at least one transient fault or perturbation, where the control parameter controls one or more of (a) a physical operation of the processor device 1800 via a physical operation control system 1806, (b) a functional operation of the fault/perturbation detection system 1802 (so as to, e.g., devote more processor device resources to transient fault detection) or (c) a functional operation of the fault resistance system 1803 (so as to, e.g., devote more processor device resources to fault resistance) via a functional operation control system 1808. In particular, the adaptive control system 1804 can use a fault/perturbation defense aggressiveness controller 1810 to adaptively adjust a control parameter to make the fault/perturbation detection system 1802 and/or other components such as the fault resistance system 1803 more aggressive in response to more frequent transient faults/perturbations and less aggressive in response to less frequent transient faults/perturbations.

A tracking interval control system 1812 is operative to: detect or track an amount of time since a last transient fault and/or perturbation; adjust the control parameter to devote more processor resources to fault defense if a new transient fault and/or perturbation is detected within a tracking interval; and adjust the control parameter to devote fewer processor resources to fault defense if a new transient fault and/or perturbation is not detected within the tracking interval. Exemplary control parameters are parameters that control one or more of: a percentage of processor device resources devoted to the fault detection system 1802 or other components such as the fault resistance system; a frequency with which the fault detection system 1802 or other components such as the fault resistance system is periodically activated by the processor device 1800; a threshold used by the processor device 1800 or components thereof for transient fault attack detection; a counter used by the processor device 1800 or components thereof for transient fault attack detection; a particular procedure used by the fault detection system 1802 and/or fault resistance system 1803 or components thereof to detect or prevent a next fault; and/or a timing of at least one process running on the processor device 1800 or components thereof relatively to at least one other process.

To adjust these or other control parameters, the processing device 1800 includes, in this example, a clock controller 1814 operative to adjust or modify a clock of the processor device 1800, a pseudorandom number generator (PRNG) 1816 operative to generate a random or pseudorandom number for use in generating a hash for gating the clock, and a clock gating controller 1818 operative to skip or gate selected clock cycles as specified by the hash code that is randomly or pseudorandomly generated and which, in some examples, provides a selected ratio of gated to non-gated clock cycles. A process resource frequency/timing/allocation system 1820 is operative to control or adjust a percentage of processor device resources devoted to the fault detection system 1802 and/or the fault resistance system 1803, a frequency with which the fault detection system 1802 and/or the fault resistance system 1803 is periodically activated by the processor device 1800, and/or a timing of at least one process running on the processor device 1800 relatively to at least one other process. A software fault sensor (SFS) selection system 1822 is operative to select or control the selection of a particular fault detection procedure (such as a particular SFS) used by the transient fault detection system 1802 of the processor device 1800.

Still further, the processor device 1800 includes, in this example: a fault counter increment/decrement system 1824 operative to increment or decrement a fault counter such as an FDC; a threshold comparison system 1816 operative to compare the fault counter to a threshold indicative of a malicious transient fault attack; a malicious transient fault attack detection system 1828 operative to determine, detect or confirm a malicious transient fault attack; and a processor countermeasure/shutdown/disablement system 1830 operative to disable the processor 1800 upon detection or confirmation of such an attack or to perform other suitable and appropriate countermeasures.

Depending upon the implementation, the functions and operations of the above-described devices and components may be performed by other suitable components that perform the same or similar functions. As such, in some examples, an apparatus, system or device is provided that includes: a means for detecting at least one transient fault or perturbation within the processor device using a fault/perturbation detection system and a means for adaptively adjusting a control parameter, in response to the at least one transient fault, where the control parameter controls one or more of (a) a physical operation of the processor device, (b) a functional operation of the fault/perturbation detection system so as to devote more processor device resources to transient fault detection and/or (c) a functional operation of the fault resistance system 1803 (so as to devote more processor device resources to fault resistance). The means for adaptively adjusting the control parameter may include means for making the fault detection system and/or the fault resistance system more aggressive in response to more frequent transient faults/perturbations and less aggressive in response to less frequent transient faults/perturbations.

The means for adaptively adjusting the control parameter may additionally or alternatively include means for detecting an amount of time since a last transient fault; means for adjusting the control parameter to devote more processor resources to fault detection if a new transient fault is detected within a tracking interval and to adjust the control parameter to devote fewer processor resources to fault detection if a new transient fault is not detected within the tracking interval. This may further include means for controlling one or more of: a percentage of processor device resources devoted to the fault detection system; a frequency with which the fault detection system is periodically activated by the processor device; a threshold used by the processor device for transient fault attack detection; a particular fault detection procedure used by the fault detection system to detect a next fault; and/or a timing of at least one process running on the processor device relatively to at least one other process. Means may be provided for controlling a physical operation of the processor device by controlling a clock of the processor device including means for skipping selected clock cycles specified by a hash code that is randomly or pseudorandomly generated. In addition, means may be provided for selecting a particular fault detection procedure from among a set of selectable fault detection procedures. Means may also be provided for detecting a transient fault attack and disabling the processor device if a count of transient faults exceeds a threshold.

Still further, depending upon the implementation, the functions and operations of the above-described devices and components may be implemented as instructions for use with a machine-readable storage medium. As such, in some examples, instructions are provided which when executed by a processing circuit causes the processing circuit to detect at least one transient fault within the processor circuit using a fault detection system and to adaptively adjust a control parameter, in response to the at least one transient fault, where the control parameter controls one or more of (a) a physical operation of the processor circuit or (b) a functional operation of the fault detection system so as to devote more processor device resources to transient fault detection. The instructions for adaptively adjusting the control parameter may include instructions for making the fault detection system more aggressive in response to more frequent transient faults and less aggressive in response to less frequent transient faults.

The instructions for adaptively adjusting the control parameter may additionally or alternatively include instructions for detecting an amount of time since a last transient fault; instructions for adjusting the control parameter to devote more processor resources to fault detection if a new transient fault is detected within a tracking interval and for adjusting the control parameter to devote fewer processor resources to fault detection if a new transient fault is not detected within the tracking interval. This may further include instructions for controlling one or more of: a percentage of processor device resources devoted to the fault detection system; a frequency with which the fault detection system is periodically activated by the processor device; a threshold used by the processor device for transient fault attack detection; a particular fault detection procedure used by the fault detection system to detect a next fault; and/or a timing of at least one process running on the processor device relatively to at least one other process. Instructions may be provided for controlling a physical operation of the processor device by controlling a clock of the processor device including instructions for skipping selected clock cycles specified by a hash code that is randomly or pseudorandomly generated. In addition, instructions may be provided for selecting a particular fault detection procedure from among a set of selectable fault detection procedures. Instructions may also be provided for detecting a transient fault attack and disabling the processor device if a count of transient faults exceeds a threshold.

FIG. 19 is a flow diagram illustrating a method operational on processor device such as the SoC of a smartphone, particularly one that is susceptible to a transient fault attack. At 1902, the processor device detects transient faults within the processor device (e.g., using a fault detection system). At 1904, the processor device adaptively adjusts a control parameter (e.g., of a transient fault defense system) of the processor device in response to the transient faults to adaptively control an amount of processor device resources devoted to transient fault defense compared to an amount of processor device resources devoted to other operations to, e.g., make the transient fault defense system more aggressive in response to more frequent transient faults and less aggressive in response to less frequent transient faults. For example, the functional operations of a fault detection system of a fault defense system may be adaptively adjusted to increase a percentage of time devoted by the processor device to defensive countermeasures, if a new transient fault is detected within a tracking interval, and to decrease the percentage of time devoted by the processor device to defensive countermeasures, if a new transient fault is not detected within a tracking interval. Note that, in various examples, the fault detection system and/or the fault defense system may be implemented in software, firmware, and/or embedded code operating in conjunction with hardware/circuits/modules of the processor device to implement fault detection functions and/or fault defense functions, respectively.

FIG. 20 is a flow diagram illustrating an alternative method operational on processor device such as the SoC of a smartphone, particularly one that is susceptible to a transient fault attack. At 2002, the processor device detects transient faults within the processor device (e.g., using a fault detection system). At 2004, the processor device adaptively adjusts a clock signal of the processor device in response to the transient faults to selectively gate clock cycles to, for example, control a ratio of gated clock cycles to non-gated clock cycles to increase the ratio in response to frequent transient faults.

FIG. 21 is a flow diagram further illustrating a method operational on a processor device. At 2102, the processor device detects transient faults within a processor device (e.g., using a fault detection system) having a set of selectable fault detection procedures, some of which are more thorough or more sophisticated than others, wherein the processor device is incorporated into a smartphone, a video player, an entertainment unit, a navigation device, a communications device, a mobile phone, a music player, a personal digital assistant, a fixed location terminal, a tablet computer and/or a laptop computer. At 2104, the processor device adaptively adjusts a control parameter, in response to the at least one transient fault, where the control parameter controls one or more of (a) a physical operation of the processor device or (b) a functional operation of the fault detection system so as to devote more processor device resources to transient fault detection, wherein the control parameter is adaptively adjusted to make fault detection more aggressive in response to more frequent transient faults and less aggressive in response to less frequent transient faults, such as by, e.g., detecting an amount of time since a last transient fault, adjusting the control parameter to devote more processor resources to fault detection if a new transient fault is detected within a tracking interval, and adjusting the control parameter to devote fewer processor resources to fault detection if a new transient fault is not detected within the tracking interval.

At 2106, additionally or alternatively, the processor device adaptively adjusts a control parameter that controls one or more of: a percentage of processor device resources devoted to fault detection; a frequency with which fault detection is periodically activated by the processor device; a threshold used by the processor device for transient fault attack detection; a particular fault detection procedure used by fault detection to detect a next fault; and/or a timing of at least one process running on the processor device relatively to at least one other process. At 2108, additionally or alternatively, the processor device adaptively adjusts a control parameter that controls a physical operation of the processor device by, e.g., controlling a clock of the processor device to run faster or slower or to skip selected clock cycles as specified by a hash code that is randomly or pseudo-randomly generated and which, e.g., selects or controls a ratio of gated to non-gated clock cycles. At 2110, the processor device detects a transient fault attack and disables the processor device (or performs other countermeasures) if a count of transient faults exceeds a threshold indicative of a transient fault attack.

FIG. 22 is a flow diagram illustrating yet another method operational on processor device such as the SoC of a smartphone. At 2202, the processor device detects transient faults within the processor device (e.g., using a fault detection system). In some examples, such fault detection system may be implemented as software, firmware, and/or embedded code operating in conjunction with hardware/circuits/modules of the processor device to implement fault detection functions. At 2204, the processor device detects an amount of time since a last transient fault. At 2206, the processor device adjusts the control parameter to increase an amount of time allocated by the processor device to transient fault defense processes compared to an amount of time allocated by the processor device to other processes, if a new transient fault is detected within a tracking interval. At 2208, the processor device adjusts the control parameter to decrease the amount of time allocated by the processor device to transient fault defense processes compared to the amount of time allocated by the processor device to other processes, if a new transient fault is not detected within a tracking interval.

FIG. 23 is a flow diagram illustrating yet another method operational on processor device such as the SoC of a smartphone. At 2302, the processor device detects transient faults within the processor device (e.g., using a fault detection system). In some examples, such fault detection system may be implemented as software, firmware, and/or embedded code operating in combination with hardware/circuits/modules of the processor device to implement fault detection functions. At 2304, the processor device tracks an amount of time since a last transient fault. At 2306, if a new transient fault is detected within a tracking interval, the processor device increases a percentage of time devoted by the processor device to defensive countermeasures in proportion to a number of new transient faults detected within the tracking interval, but only if a number of new transient faults detected within the tracking interval exceeds a lower threshold. At 2308, the processor device increases the percentage of time devoted to defensive countermeasures to a maximum countermeasure level, if the number of new transient faults detected within the tracking interval reaches a middle threshold and then disables the processor device if the number of new transient faults detected within the tracking interval reaches a top threshold. At 2310, the processor device decreases the percentage of time devoted by the processor device to defensive countermeasures, if a new transient fault is not detected within a tracking interval.

FIG. 24 is a flow diagram illustrating still yet another method operational on processor device such as the SoC of a smartphone. At 2402, the processor device detects transient faults within the processor device (e.g., using a fault detection system). In some examples, such fault detection system may be implemented in software, firmware, and/or embedded code operating in conjunction with hardware/circuits/modules of the processor device to implement fault detection functions. At 2404, the processor device detects an amount of time since a last transient fault. At 2406, the processor device adjusts a control parameter of the processor device to increase a number of gated clock cycles, if a new transient fault is detected within a tracking interval. At 2408, the processor device adjusts the control parameter of the processor device to decrease a number of gated clock cycles, if a new transient fault is not detected within a tracking interval.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine-readable mediums for storing information. The term "machine readable medium" includes, but is not limited to portable or fixed storage devices, optical storage devices, wireless channels and various other mediums capable of storing, containing, or carrying instruction(s) and/or data.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a processor device, comprising:
    detecting transient faults within the processor device wherein the transient faults occur within the processor device;
    counting a number of the detected transient faults within a tracking interval;
    continuously devoting an amount of processor device resources to transient fault defense;
    adaptively adjusting a control parameter in response to the detected transient faults to adaptively control the amount of processor device resources devoted to transient fault defense compared to an amount of processor device resources devoted to other operations, the control parameter adaptively adjusted to change a clock signal of the processor device to therefore vary time localization of at least one processor device resource relative to the detected transient faults; and
    disabling the processor device when the count of detected transient faults exceeds a threshold during the tracking interval.

2. The method of claim 1, wherein the processor device resources include a transient fault defense system configured to adaptively adjust the control parameter, where the transient fault defense system includes one or more of a transient fault resistance system, the transient fault detection system and a transient fault reaction system, and wherein adaptively adjusting the control parameter is performed to control one or more of the transient fault resistance system, the transient fault detection system, and the transient fault reaction system.

3. The method of claim 1, wherein the control parameter is adaptively adjusted to more aggressively respond to more frequent transient faults and less aggressively respond to less frequent transient faults.

4. The method of claim 1, wherein adaptively adjusting the control parameter comprises:
    detecting an amount of time since a last transient fault;
    adjusting the control parameter to increase an amount of time allocated by the processor device to transient fault defense processes compared to an amount of time allocated by the processor device to other processes, if a new transient fault is detected within a tracking interval; and
    adjusting the control parameter to decrease the amount of time allocated by the processor device to transient fault defense processes compared to the amount of time allocated by the processor device to other processes, if a new transient fault is not detected within a tracking interval.

5. The method of claim 1, wherein the control parameter controls one or more of:
    a percentage of processor device resources devoted to transient fault defense;
    a frequency with which components used for fault defense are periodically activated by the processor device;
    a duration of execution of components used for fault defense;
    a threshold used for transient fault detection and/or transient fault attack detection;
    a threshold used by a peripheral sensor connected to the processor device for transient fault attack detection;
    a particular fault detection procedure used to detect a next fault; and/or
    a timing of at least one process running on the processor device relative to at least one other process.

6. The method of claim 1, wherein adaptively adjusting the control parameter comprises:
    tracking an amount of time since a last transient fault;
    increasing a percentage of time devoted by the processor device to defensive countermeasures, if a new transient fault is detected within a tracking interval; and
    decreasing the percentage of time devoted by the processor device to defensive countermeasures, if a new transient fault is not detected within a tracking interval.

7. The method of claim 6, wherein the percentage of time devoted by the processor device to defensive countermeasures is increased only if a number of new transient faults detected within the tracking interval exceeds a lower threshold.

8. The method of claim 6, wherein the percentage of time devoted by the processor device to defensive countermeasures is increased during the tracking interval in proportion to a number of new transient faults detected within the tracking interval.

9. The method of claim 6, wherein the percentage of time devoted by the processor device to defensive countermeasures is increased to a maximum countermeasure level, if the number of new transient faults detected within the tracking interval reaches a middle threshold.

10. The method of claim 6, wherein the processor device is disabled if the number of new transient faults detected within the tracking interval reaches a top threshold.

11. The method of claim 1, wherein the processor device is incorporated into at least one of a smartphone, a video player, an entertainment unit, a navigation device, a communications device, a mobile phone, a music player, a personal digital assistant, a fixed location terminal, a tablet computer, and/or a laptop computer.

12. A processor device, comprising:
    a communication interface;
    a processing circuit coupled to the communication interface, the processing circuit configured to detect transient faults within the processor device wherein the transient faults occur within the processor device;

count a number of the detected transient faults within a tracking interval;

continuously devoting an amount of processor device resources to transient fault defense;

adaptively adjust a control parameter of the processor device in response to the transient faults to adaptively control the amount of processor device resources devoted to transient fault defense compared to an amount of processor device resources devoted to other operations, the control parameter adaptively adjusted to change a clock signal of the processor device to therefore vary time localization of at least one processor device resource relative to the detected transient faults; and disable the processor device when the count of detected transient faults exceeds a threshold during the tracking interval.

13. The processor device of claim 12, wherein the processor device resources include a transient fault defense system configured to adaptively adjust the control parameter, where the transient fault defense system includes one or more of a transient fault resistance system, the transient fault detection system, and a transient fault reaction system.

14. The processor device of claim 12, wherein the processing circuit is configured to adaptively adjust the control parameter to more aggressively respond to more frequent transient faults and less aggressively respond to less frequent transient faults.

15. The processor device of claim 12, wherein the processing circuit is configured to adaptively adjust the control parameter by:

detecting an amount of time since a last transient fault;

adjusting the control parameter to increase an amount of time allocated by the processor device to transient fault defense processes compared to an amount of time allocated by the processor device to other processes, if a new transient fault is detected within a tracking interval; and adjusting the control parameter to decrease the amount of time allocated by the processor device to transient fault defense processes compared to the amount of time allocated by the processor device to other processes, if a new transient fault is not detected within a tracking interval.

16. The processor device of claim 12, wherein the control parameter is configured to control one or more of:

a percentage of processor device resources devoted to transient fault defense;

a frequency with which components used for transient fault defense are periodically activated by the processor device;

a duration of execution of components of the fault defense;

a threshold used for transient fault detection and/or for transient fault attack detection;

a threshold used by a peripheral sensor connected to the processor device for transient fault attack detection;

a particular fault detection procedure used to detect a next fault; and/or a timing of at least one process running on the processor device relative to at least one other process.

17. The processor device of claim 12, wherein the processing circuit is configured to adaptively adjust the control parameter by:

tracking an amount of time since a last transient fault;

increasing a percentage of time devoted by the processor device to defensive countermeasures, if a new transient fault is detected within a tracking interval; and decreasing the percentage of time devoted by the processor device to defensive countermeasures, if a new transient fault is not detected within a tracking interval.

18. The processor device of claim 17, wherein the processing circuit is configured to increase the percentage of time devoted by the processor device to defensive countermeasures only if a number of new transient faults detected within the tracking interval exceeds a lower threshold.

19. The processor device of claim 17, wherein the processing circuit is configured to increase the percentage of time devoted by the processor device to defensive countermeasures during the tracking interval in proportion to a number of new transient faults detected within the tracking interval.

20. The processor device of claim 19, wherein the processing circuit is configured to increase the percentage of time devoted by the processor device to defensive countermeasures to a maximum countermeasure level, if the number of new transient faults detected within the tracking interval reaches a middle threshold.

21. The processor device of claim 19, wherein the processing circuit is configured to disable the processor device if the number of new transient faults detected within the tracking interval reaches a top threshold.

22. The processor device of claim 12, wherein the processor device is incorporated into at least one of a smartphone, a video player, an entertainment unit, a navigation device, a communications device, a mobile phone, a music player, a personal digital assistant, a fixed location terminal, a tablet computer, and/or a laptop computer.

23. A processor device, comprising:

means for detecting transient faults within the processor device wherein the transient faults occur within the processor device;

means for counting a number of the detected transient faults within a tracking interval;

means for continuously devoting an amount of processor device resources to transient fault defense;

means for adaptively adjusting a control parameter of the processor device in response to the transient faults to adaptively control the amount of processor device resources devoted to transient fault defense compared to an amount of processor device resources devoted to other operations, the control parameter adaptively adjusted to change a clock signal of the processor device to therefore vary time localization of at least one processor device resource relative to the detected transient faults; and disabling the processor device when the count of detected transient faults exceeds a threshold during the tracking interval.

24. The processor device of claim 23, wherein the means for adaptively adjusting the control parameter adaptively adjusts the control parameter to more aggressively respond to more frequent transient faults and to less aggressively respond to less frequent transient faults.

25. The processor device of claim 23, wherein the means for adaptively adjusting the control parameter comprises:

means for detecting an amount of time since a last transient fault;

means for adjusting the control parameter to increase an amount of time allocated by the processor device to transient fault defense processes compared to an amount of time allocated by the processor device to other processes, if a new transient fault is detected within a tracking interval; and means for adjusting the control parameter to decrease the amount of time allocated by the processor device to transient fault defense processes compared to the amount of time allocated by the processor device to other processes, if a new transient fault is not detected within a tracking interval.

26. A non-transitory machine-readable storage medium having one or more instructions which when executed by a processing circuit causes the processor device to:

detect transient faults within the processor device wherein the transient faults occur within the processor device;

count a number of the detected transient faults within a tracking interval;

continuously devote an amount of processor device resources to transient fault defense;

adaptively adjust a control parameter for transient fault defense of the processor device in response to the transient faults to adaptively control the amount of processor device resources devoted to transient fault defense compared to an amount of processor device resources devoted to other operations, the control parameter adaptively adjusted to change a clock signal of the processor device to therefore vary time localization of at least one processor device resource relative to the detected transient faults; and disable the processor device when the count of detected transient faults exceeds a threshold during the tracking interval.

27. The machine-readable storage medium of claim 26, further having one or more instructions which when executed by the processing circuit causes the processing circuit to adaptively adjust the control parameter to more aggressively respond to more frequent transient faults and less aggressively respond to less frequent transient faults.

28. The machine-readable storage medium of claim 26, further having one or more instructions which when executed by the processing circuit causes the processing circuit to:

detect an amount of time since a last transient fault;

adjust the control parameter to increase an amount of time allocated by the processor device to transient fault defense processes compared to an amount of time allocated by the processor device to other processes, if a new transient fault is detected within a tracking interval; and adjust the control parameter to decrease the amount of time allocated by the processor device to transient fault defense processes compared to the amount of time allocated by the processor device to other processes, if a new transient fault is not detected within a tracking interval.

29. A method operational on a processor device, comprising:

detecting transient faults within the processor device wherein the transient faults occur within the processor device;

continuously devoting an amount of processor device resources to detecting the transient faults; and adaptively adjusting a clock signal of the processor device in response to the transient faults to selectively gate clock cycles by selectively skipping clock cycles.

30. The method of claim 29, wherein the clock signal is adaptively adjusted by applying a hash code to select clock cycles of the clock signal to selectively skip.

31. The method of claim 30, wherein the hash code is randomly or pseudorandomly generated.

32. The method of claim 29, wherein the clock signal is adaptively adjusted to control a ratio of gated clock cycles to non-gated clock cycles.

33. The method of claim 29, wherein adaptively adjusting the clock signal comprises:

detecting an amount of time since a last transient fault;

adjusting the control parameter to increase a number of gated clock cycles, if a new transient fault is detected within a tracking interval; and adjusting the control parameter to decrease the number of gated clock cycles, if a new transient fault is not detected within a tracking interval.

34. The method of claim 29, wherein the processor device is incorporated into at least one of a smartphone, a video player, an entertainment unit, a navigation device, a communications device, a mobile phone, a music player, a personal digital assistant, a fixed location terminal, a tablet computer, and/or a laptop computer.

35. A processor device, comprising:

a communication interface; and a processing circuit coupled to the communication interface, the processing circuit configured to detect transient faults within the processor device wherein the transient faults occur within the processor device;

count a number of the detected transient faults within a tracking interval;

continuously devoting an amount of processor device resources to detecting the transient faults;

adaptively adjust a clock signal of the processor device in response to the transient faults to selectively gate clock cycles by selectively skipping clock cycles; and disable the processor device when the number of the detected transient faults exceeds a threshold during the tracking interval.

36. The processor device of claim 35, wherein the processing circuit is further configured to adaptively adjust the clock signal by applying a hash code to select clock cycles of the clock signal to selectively skip.

37. The processor device of claim 36, wherein the processing circuit is further configured to randomly or pseudorandomly generate the hash code.

38. The processor device of claim 35, wherein the processing circuit is further configured to adaptively adjust the clock signal to control a ratio of gated clock cycles to non-gated clock cycles.

39. The processor device of claim 35, wherein the processing circuit is configured to adaptively adjust the clock signal by:

detecting an amount of time since a last transient fault;

adjusting the control parameter to increase a number of gated clock cycles, if a new transient fault is detected within a tracking interval; and adjusting the control parameter to decrease the number of gated clock cycles, if a new transient fault is not detected within a tracking interval.

40. The processor device of claim 35, wherein the processor device is incorporated into at least one of a smartphone, a video player, an entertainment unit, a navigation device, a communications device, a mobile phone, a music player, a personal digital assistant, a fixed location terminal, a tablet computer, and/or a laptop computer.

41. A processor device, comprising:

means for detecting transient faults within the processor device wherein the transient faults occur within the processor device;

means for counting a number of the detected transient faults within a tracking interval;

means for continuously devoting an amount of processor device resources to detecting the transient faults;

means for adaptively adjusting a clock signal of the processor device in response to the transient faults to selectively gate clock cycles by selectively skipping clock cycles; and means for disabling the processor device when the number of the detected transient faults exceeds a threshold during the tracking interval.

42. A non-transitory machine-readable storage medium having one or more instructions which when executed by a processing circuit processor device causes the processing circuit processor device to:

detect transient faults within the processor device wherein the transient faults occur within the processor device;

count a number of the detected transient faults within a tracking interval;

continuously devote an amount of processor device resources to detecting the transient faults;

adaptively adjust a clock signal of the processor device in response to the transient faults to selectively gate clock cycles by selectively skipping clock cycles; and disable the processor device when the number of the detected transient faults exceeds a threshold during the tracking interval.

\* \* \* \* \*